US008762920B2

(12) United States Patent
Darnell et al.

(10) Patent No.: US 8,762,920 B2
(45) Date of Patent: Jun. 24, 2014

(54) INTERCONNECTION SYSTEM AND METHOD

(75) Inventors: Brad T. Darnell, Berkeley, CA (US); Michael Kauffman, Campbell, CA (US); David K. Wong, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 442 days.

(21) Appl. No.: 12/960,566

(22) Filed: Dec. 6, 2010

(65) Prior Publication Data
US 2012/0141124 A1 Jun. 7, 2012

(51) Int. Cl.
*G06F 17/50* (2006.01)

(52) U.S. Cl.
USPC .............................. 716/126; 716/129; 716/130

(58) Field of Classification Search
USPC ........................ 716/126, 129, 130; 398/45, 49; 370/360, 386–388
See application file for complete search history.

(56) References Cited

U.S. PATENT DOCUMENTS

| | | | | |
|---|---|---|---|---|
| 2005/0240893 A1* | 10/2005 | Teig et al. | ........................ | 716/13 |
| 2005/0275504 A1* | 12/2005 | Torza | ............................ | 340/2.22 |
| 2010/0195289 A1* | 8/2010 | Hubal | ............................ | 361/733 |
| 2011/0060857 A1* | 3/2011 | Bennett | ........................ | 710/125 |
| 2011/0123014 A1* | 5/2011 | Smith | ............................ | 379/242 |

* cited by examiner

*Primary Examiner* — Vuthe Siek
(74) *Attorney, Agent, or Firm* — Ross M. Carothers; David L. Soltz

(57) ABSTRACT

The present disclosure provides a system, apparatus and method to transport data across a network node, as part of a network infrastructure of an optical transmission system. According to the various embodiments of the disclosure, a base architecture is provided which includes interconnectivity providing high throughput, while mitigating factors which may lead to signal loss or signal degradation. The base architecture is easily expandable to accommodate additional traffic.

18 Claims, 21 Drawing Sheets

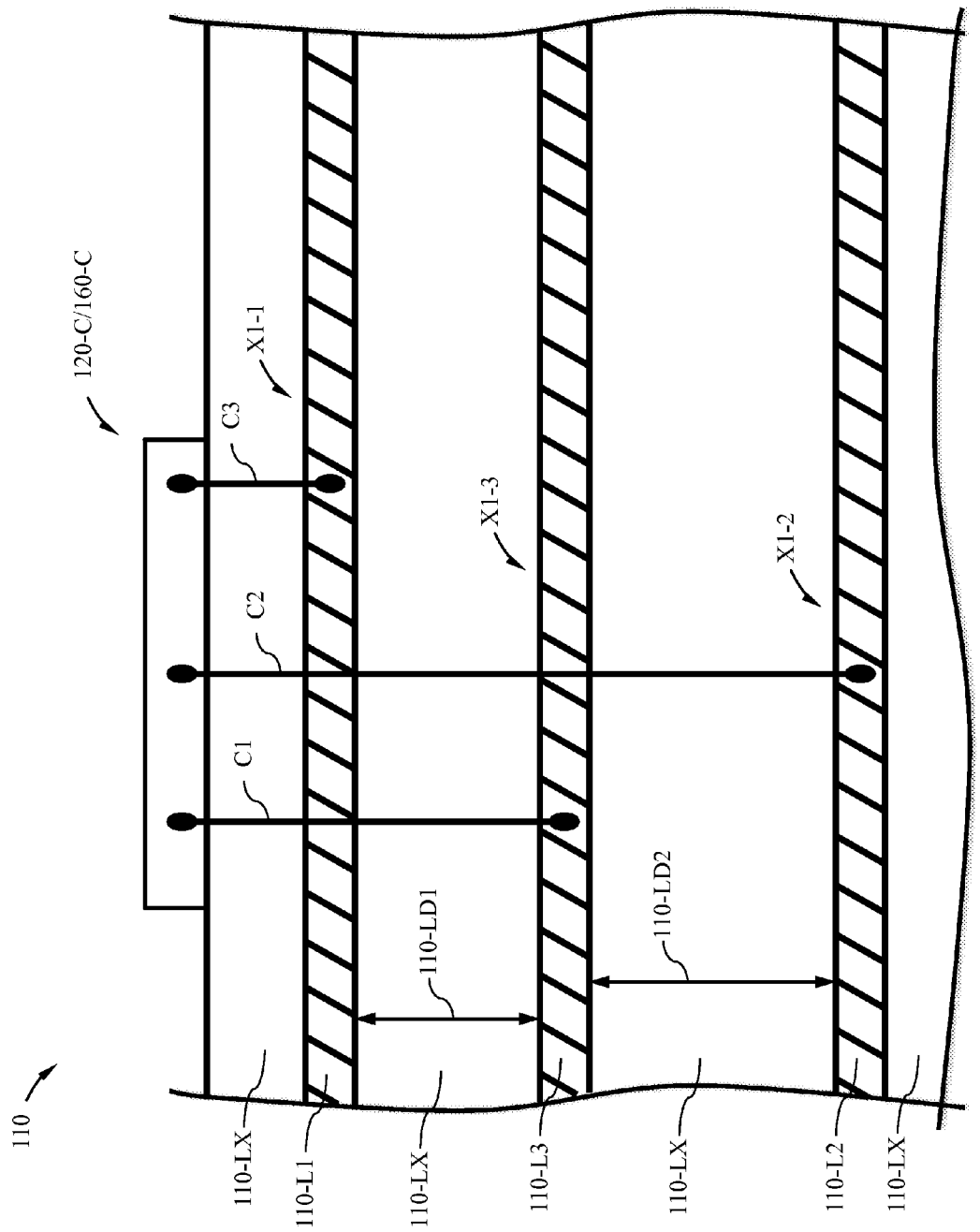

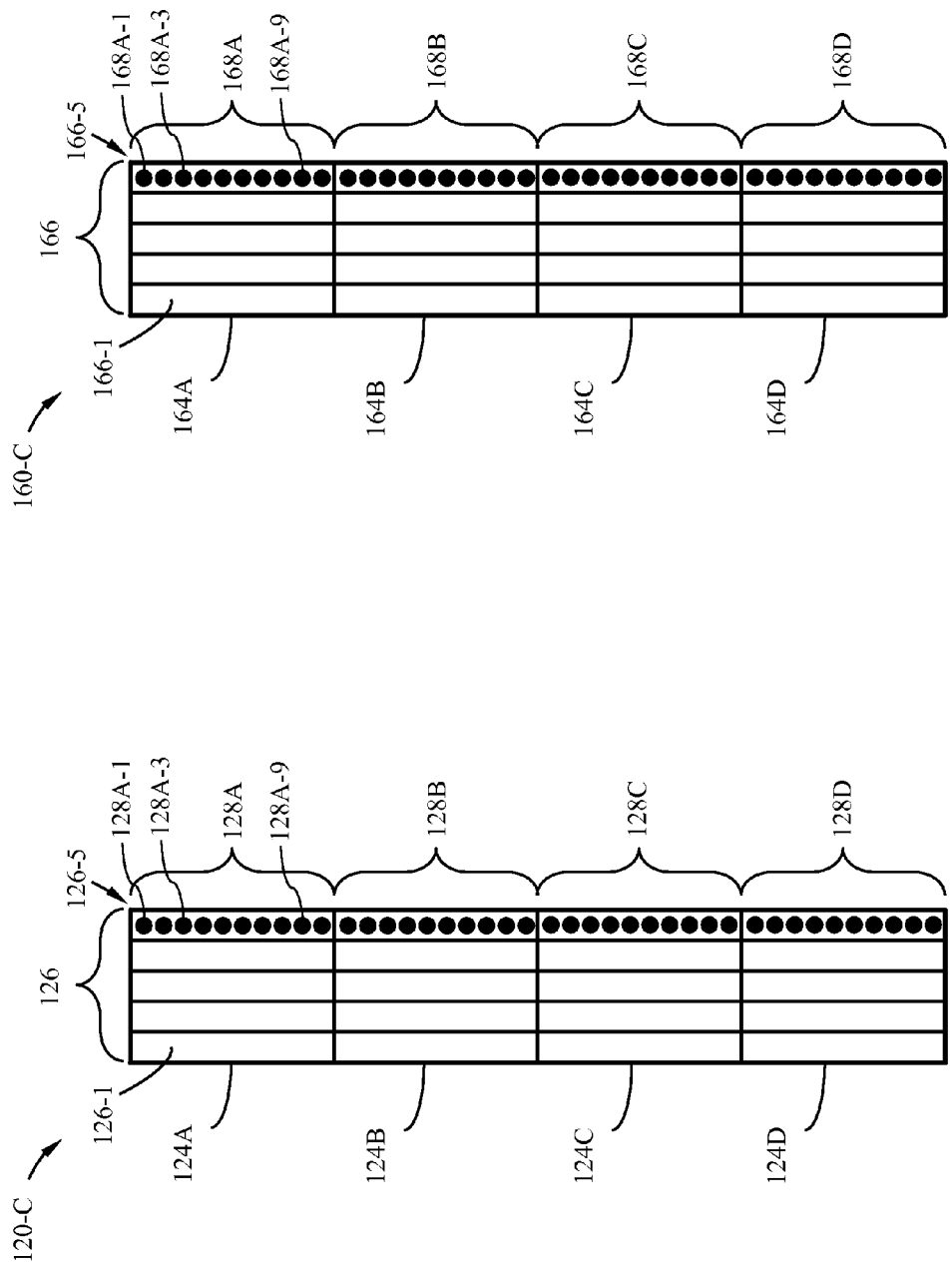

| Sub-Lengths | Overall Length | Af | IL | ILD | RL |
|---|---|---|---|---|---|
| 4-10-4 | 18 | ✔ | ✔ | ✘ | ? |
| 4-14-4 | 22 | ✔ | ✔ | ✘ | ? |
| 4-18-4 | 26 | ✔ | ✔ | ✘ | ? |
| 4-22-4 | 30 | ✔ | ✔ | ✔ | ? |
| 4-26-4 | 34 | ✔ | ✔ | ✔ | ? |
| 4-30-4 | 38 | ✔ | ✔ | ✔ | ? |
| 4-34-4 | 42 | ✔ | ✔ | ✔ | ? |
| 7-10-7 | 24 | ✔ | ✔ | ✔ | ✔ |
| 7-14-7 | 28 | ✔ | ✔ | ✔ | ✔ |
| 7-18-7 | 32 | ✔ | ✔ | ✔ | ✔ |
| 7-22-7 | 36 | ✔ | ✔ | ✔ | ✔ |
| 7-26-7 | 40 | ✔ | ✔ | ✔ | ✔ |
| 7-30-7 | 44 | ✔ | ✔ | ✔ | ✔ |
| 7-34-7 | 48 | ✔ | ✔ | ✔ | ✔ |
| 10-10-10 | 30 | ✔ | ✔ | ✔ | ✔ |
| 10-14-10 | 34 | ✔ | ✔ | ✔ | ✔ |
| 10-18-10 | 38 | ✔ | ✔ | ✔ | ✔ |
| 10-22-10 | 42 | ✔ | ✔ | ✔ | ✔ |
| 10-26-10 | 46 | ✔ | ✔ | ✔ | ✔ |
| 10-30-10 | 50 | ? | ? | ✔ | ✔ |
| 10-34-10 | 54 | ✘ | ✘ | ✔ | ✔ |
| 13-10-13 | 36 | ✔ | ✔ | ✔ | ✔ |
| 13-14-13 | 40 | ✔ | ✔ | ✔ | ✔ |
| 13-18-13 | 44 | ✘ | ✘ | ✔ | ✔ |
| 13-22-13 | 48 | ✘ | ✘ | ✔ | ✔ |
| 13-26-13 | 52 | ✘ | ✘ | ✔ | ✔ |
| 13-30-13 | 56 | ✘ | ✘ | ✔ | ✔ |
| 13-34-13 | 60 | ✘ | ✘ | ✔ | ✔ |

| | |
|---|---|
| ✔ | Pass |
| ? | Close |
| ✘ | Fail |

*FIG. 11*

INTERCONNECTION SYSTEM AND METHOD

BACKGROUND

Optical transmission networks are deployed for transporting data across a network infrastructure. The network infrastructure may include, for example, long haul networks, metropolitan area networks, and networks employed in other optical communication applications. Hardware associated with the optical transmission system may be configured to allow for the transfer of information across the network infrastructure, from a source node to a destination node for example. A base architecture, as part of a node of a nodal system, may include a number of line modules or line cards configured to receive and send data on ports. The line modules are typically electronically coupled to each other through a series of interconnections provided on a backplane. Typically, the base architecture includes one or more systems which interconnect the various cards or modules to facilitate transmission of data through the node.

The backplane and various line modules, as part of the base architecture, are preferably configured to support high data or bit rates while mitigating signal degradation. For example, the data may be received by a node on a first port of a module and be transmitted across a length of a backplane, and finally exiting from the node on a second port of the module. With increasing demand for capacity, such base architecture systems are required to support ever increasing bit rates. However, at high bit rates, data signals may be subject to impairments including, but not limited to, insertion loss, return loss, and crosstalk.

What is needed is a base architecture for nodal systems which is configured to provide high data throughput without undesirable signal degradation, associated with insertion loss, return loss, and crosstalk for example. Further, what is needed is a base architecture which provides for minimal length interconnections between the various modules of the base architecture, requiring fewer layers as part of the backplane, for example, to provide desired connectivity leading to lower system costs and higher system performance.

SUMMARY

The present disclosure provides a system, apparatus and method to transport data across a network node, as part of a network infrastructure of an optical transmission system. According to one aspect of the various embodiments, a base architecture includes an interconnection system having a backplane, a plurality of line modules and a plurality of switch modules. The backplane includes a plurality of interconnection layers, each including one of a plurality of groups of interconnections for connecting the line modules to the switch modules. Each of the plurality of line modules may be connected to not more than two of the plurality of switch modules via respective first and second interconnections, as part of the plurality of groups of interconnections to limit the length of the interconnections to the corresponding Manhattan length.

In certain embodiments, the plurality of groups of interconnections provide full-mesh interconnectivity between the plurality of line modules. In other embodiments, the plurality of line modules includes a first plurality of line modules and a second plurality of line modules, and the backplane has a planar surface having first, second and third regions. The first plurality of line modules may be provided on the first region, the second plurality of line modules may be provided on the second region, and the plurality of switch modules may be provided on the third region. The first, second, and third regions may be positioned such that the third region is between the first and second regions.

In still other embodiments, a number of line modules may be equal to a number of switch modules, and a number of the plurality of groups of interconnection layers may be equal to the number of switch modules minus one. In certain embodiments, one or more line modules is provided on a line card and one or more switch modules is provided on a switch card. In some embodiments the number of switch modules is 10. Each of the plurality of groups of interconnections may include a plurality of conductor pairs, each of the conductor pairs being configured to carry a one of a plurality of signals. In certain embodiments, the plurality of signals includes a plurality of differential signals, each of the differential signals may be a 10 Gbps signal. In certain embodiments, the interconnection system is provided in accordance with a specification, such as the IEEE Std. 802.3ap-2007 specification.

Other objects, features and advantages of the invention will be apparent from the drawings, and from the detailed description that follows below.

BRIEF DESCRIPTION OF THE DRAWINGS

The accompanying drawings, which are incorporated in and constitute a part of this specification, illustrate one or more implementations described herein and, together with the description, explain these implementations. These drawings are intended to be illustrative, not limiting. In the drawings wherein like reference symbols refer to like parts:

FIG. 4C is a partial cutaway view of a portion of a backplane, as part of the base architecture of FIG. 1, depicting exemplary connections between a connector associated with a module of the interconnection system and various interconnection layers, according to certain aspects of the embodiments of this disclosure;

FIG. 5A depicts an exemplary layout of a first connection point, according to certain aspects of the embodiments of this disclosure;

FIG. 5B depicts an exemplary layout of a second connection point, according to certain aspects of the embodiments of this disclosure;

FIG. 11 depicts an exemplary solution summary for interconnections of certain characteristics, in accordance with certain aspects of the embodiments of this disclosure.

DETAILED DESCRIPTION

The present disclosure provides a system, apparatus and method to transport data across a network node, as part of a network infrastructure of an optical transmission system. According to the various embodiments of the disclosure, a base architecture is provided which includes interconnectivity providing high throughput, while mitigating factors which may lead to signal loss or signal degradation. The base architecture of the present disclosure provides for interconnections between the various modules, line modules and switch modules for example, of the base architecture on a plurality of groups of interconnection layers. Line modules are interconnected with a limited number of switch modules per interconnection layer to ensure that proper spacing between the interconnections is provided and the lengths of the interconnections are equal to or less than corresponding Manhattan lengths in order to increase signal integrity, and limiting signal loss. With switch module capacity equal to line module capacity and the number of line modules equaling the number of switch modules, full-mesh connectivity may be achieved between the line modules. The base architecture is easily expandable to accommodate additional traffic.

The following description is set forth for purpose of explanation in order to provide an understanding of the various embodiments of the disclosure. However, it is apparent that one skilled in the art will recognize that these embodiments, some of which are described below, may be incorporated into a number of different systems and devices. Additionally, the embodiments of the present disclosure may include certain aspects each of which may be present in hardware, software, or firmware. Structures and devices shown in block diagram in the figures are illustrative of exemplary embodiments and are meant to avoid obscuring certain aspects of the embodiments of the disclosure. Furthermore, connections between components within the figures are not intended to be limited to direct connections. Rather, data between these components may be modified, re-formatted or otherwise changed by intermediary components.

Figure 1:
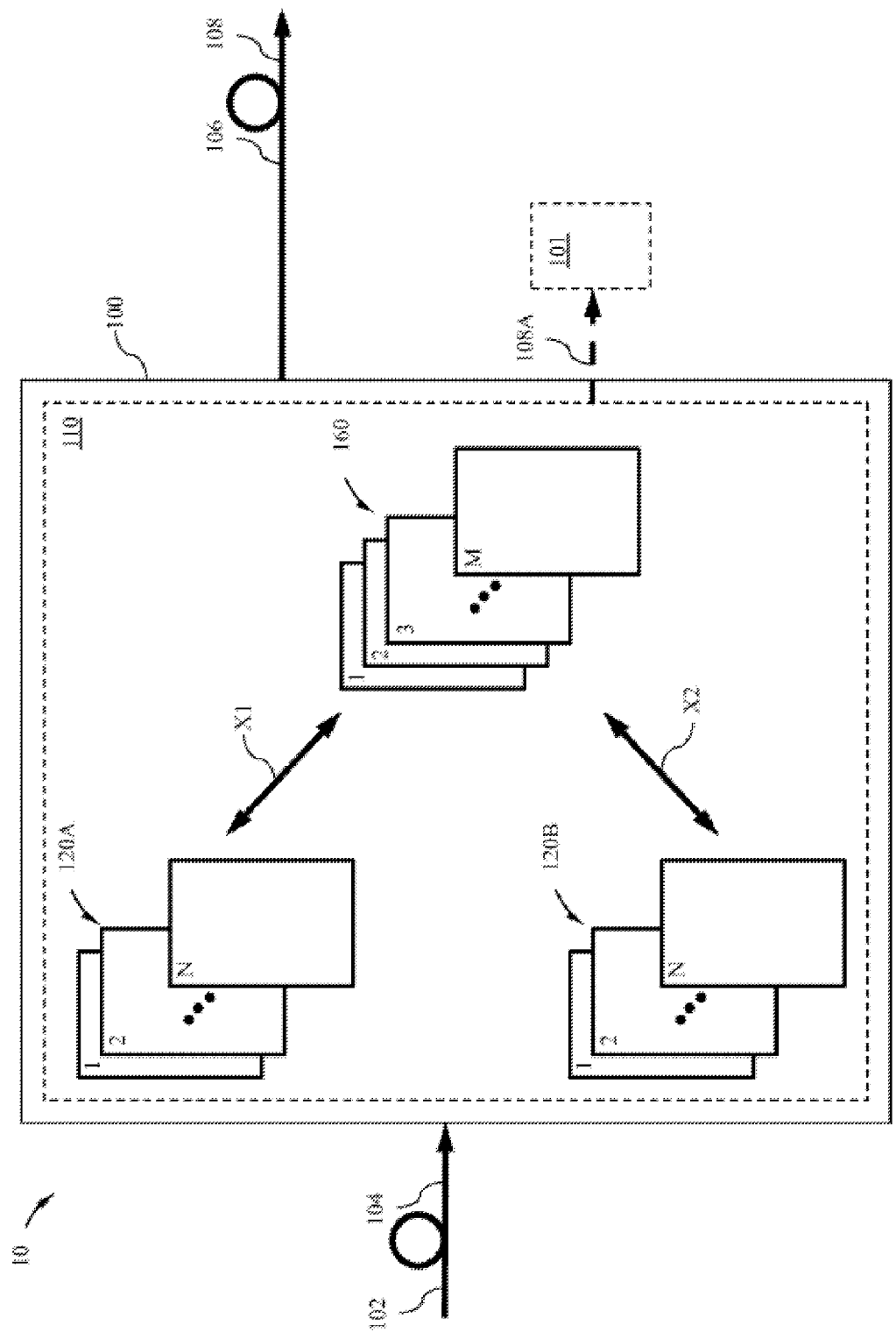
FIG. 1 illustrates a general block diagram of a base architecture of a node, according to certain aspects of the embodiments of this disclosure.

FIG. 1 illustrates a general block diagram of a base architecture or system 100, as part of a node 10 of an optical telecommunication system for example. The node 10 may include one or more base systems 100. Typically, the base system 100 receives one or more input signals 102 at a corresponding input 104, and processes the input signals 102 to provide one or more output signals 108 as an output 106 of the base system 100. The input signals 102 may be optical signals, as depicted, or alternatively, the input signals 102 may be electrical signals. Moreover, the input signals 102 may be multiplexed signals, such as wavelength division multiplexed signals, for example. The input signals 102 may originate from another node, as part of the network infrastructure, or may originate at another system 101 of node 10. Additionally, the output signals 108 may be provided to another node (not shown), as part of the network infrastructure, or may be destined to another base system 101 of the node 10. For example, one or more output signals 108A, shown in dashed line, which may be directed to another base system 101 as part of node 10. While only one input 104 is shown, the base system 100 typically includes multiple inputs, collectively referred to herein as inputs 104. Similarly, the base system 100 may include multiple outputs 106, collectively referred to herein as outputs 106.

The base system 100 includes a backplane 110, a first number of line modules 120A, a second number of line modules 120B, and a number of switch modules 160. Line modules 120A and line modules 120B are collectively referred to herein as line modules 120. The base system may include slots which guide the line modules 120 and the switch modules 160 to interface with the backplane 110, as described in greater detail below. The line modules 120 may receive input signals 102 with the base system 100, and may be configured to include a number or ports, each port being able to either to accept an input signal 102 or provide an output signal 108 for example. Once within the base system 100, the input signals 102 may be processed, as discussed in more detail below, and provided as an output signal 108 on an output 106 of the base system 100.

As depicted, the first number of line modules 120A may include N line modules 120A, and the second number of line modules 120B may include N line modules 120B, and the number of switch modules 160 may include M switch modules. The backplane 110 is configured to provide interconnections between each of the first number of line modules 120A and the switch modules 160, as indicated by arrow X1. Additionally, the backplane 110 provides interconnections between each of the second number of line modules 120B and the switch modules 160, as indicated by arrow X2. Preferably, each of the first number of line modules 120A interconnects with each of the switch cards 160, and each of the second number of line modules 120B interconnects with each of the switch cards 160. In this way, a full-mesh topology is provided, as discussed in greater detail with reference to FIG. 2.

Figure 2:
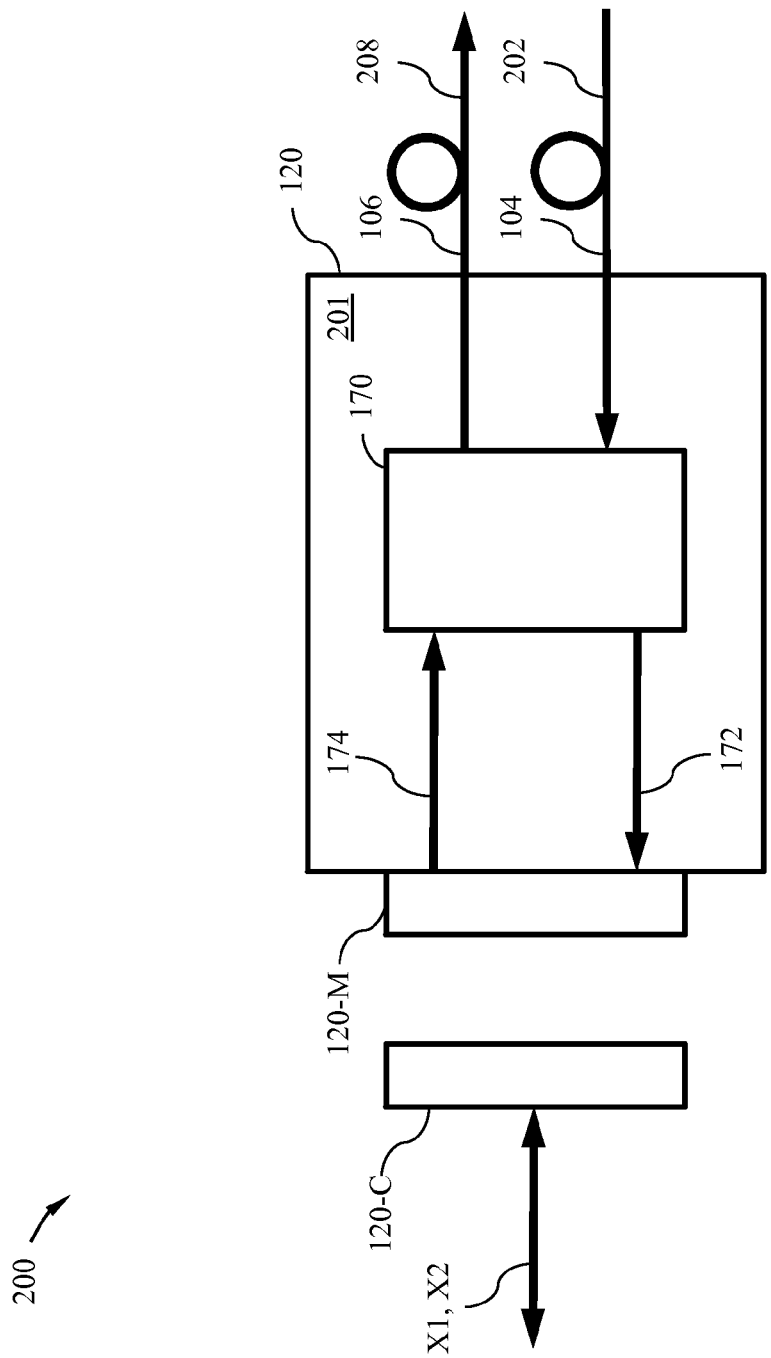
FIG. 2 is a general block diagram of a line module, according to certain aspects of the embodiments of this disclosure.

FIG. 2 illustrates a circuit 200 depicting an exemplary line module 120. The line module 120 may include a printed circuit substrate 201 made of any suitable material, such as Nelco 4000-13 available from Park-Nelco or Megtron 6 available from Panasonic®, for example. The interconnectivity on the line module 120 itself may be provided by traces on substrate 201, such as copper traces, as is well know in the art.

Line module 120 is configured to receive optical input signals 202 on inputs 104. The optical input signals 202 are provided to a signal processing circuit 170 which, among other things, converts the input signals 102 into electrical signals. The signal processing circuit 170 may include additional functionality related to the processing of data signals carried by the input optical signals 202. Such functionality may include, but is not limited to, serialization/deserialization, framing/deframing, and FEC encoding/decoding. The signal processing circuit 170 provides an output signal 172 in response to the received input signal 102. The output signal 172, in turn, is provided to a connector 120-M which, for example, mates to a line module connector 120-C provided on backplane 110. The connector pair 120-M, 120-C may be any suitable connector pair. For example, the connector pair 120-M, 120-C may include press fit connections, also referred to as impact connections, as is known in the art. The backplane 110 may include pin receptacles, as part of the connector 120-C, which are configured to receive pins, as part of the connector 120-M. The line module connector 120-C may be interconnected to other similar line module connectors 120-C and switch module connectors 160-C via interconnections X1 and X2, as is discussed in greater detail below. Electrical signals transmitted on backplane 110 may be provided to the line module connector 120-C via the interconnections X1, X2 and fed to the line module 120 as input signal 174 via the mating connector 120-M. Signal processing circuit 170 may also receive input signal 174 and generate an optical output 208 on output 106 in response thereto. While described as having a single signal processing circuit 170, one of ordinary skill in the art will appreciate that the line module 120 may include multiple processing circuits for processing the various signals 202, 173, 174, 208.

Figure 3:
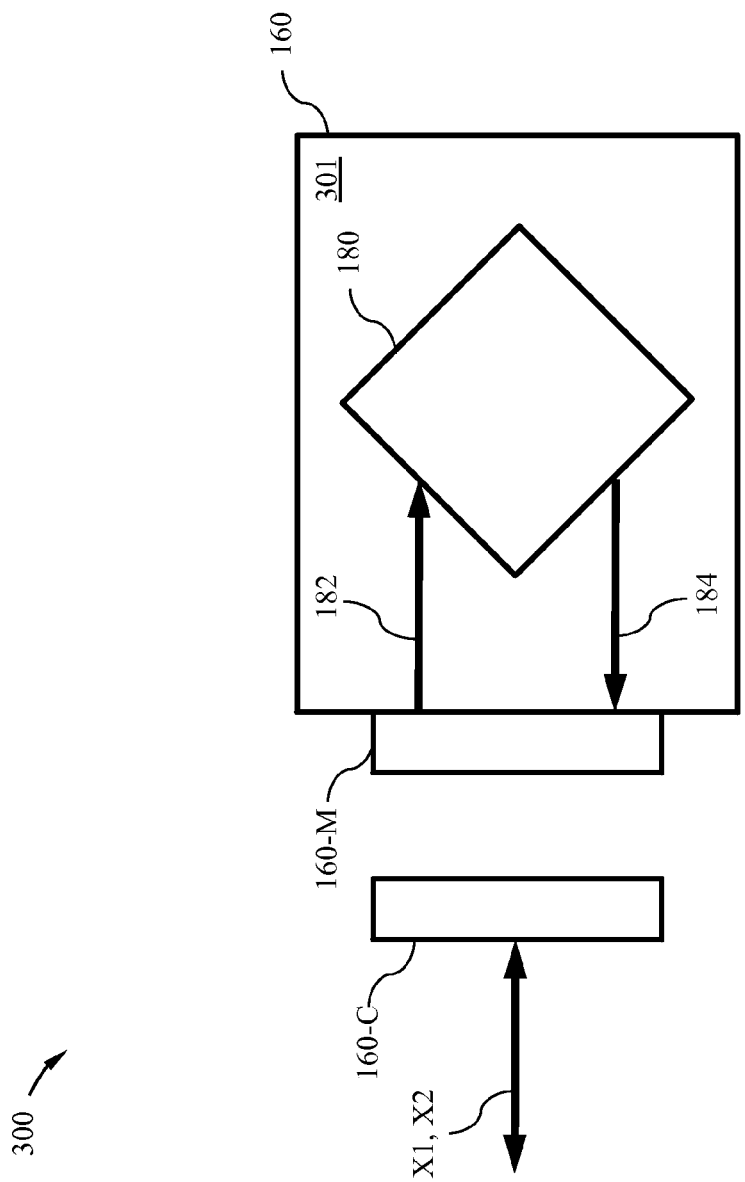
FIG. 3 is a general block diagram of a switch module, according to certain aspects of the embodiments of this disclosure.

FIG. 3 illustrates a circuit 300 depicting an exemplary switch module 160 configured to interface with the backplane 110. The interconnections X1, X2 of the backplane 110 interface with a switch module 160 via switch module connector 160-C. The switch module 160 may be provided on a printed circuit board substrate 301 including any suitable material, such as Nelco 4000-13 available from Park-Nelco or Megtron 6 available from Panasonic®, for example. The interconnectivity on the switch module 160 itself may be provided by traces on substrate 301, such as copper traces, as is well know in the art.

Switch module connector 160-C interfaces with the switch module 160 via a mating connector 160-M, for example. The switch module 160 receives electrical signals 182 from switch module connector pair 160-M, 160-C and provides the electrical signals 182 to a switch 180. The connector pair 160-M, 160-C may be any suitable connector pair. For example, the connector pair 160-M, 160-C may include press fit connections, also referred to as impact connections, as is known in the art. Such impact connections may include pins (provided as part of connector 160-C) and pin receptacles (provided as part of connector 160-M. The switch module 160 supplies each of the received electrical signals 182 to one of a plurality of outputs as a corresponding one of a plurality of electrical signals 184. Preferably, the interconnections of the base system 100 of FIG. 1 provides full-mesh interconnectivity, such that any of the interconnections X1, X2, between the various connectors 120-C, 160-C, may be electrically coupled to any of the remaining interconnections X1, X2 through switch 180 of the switch module 160.

Figure 4A:
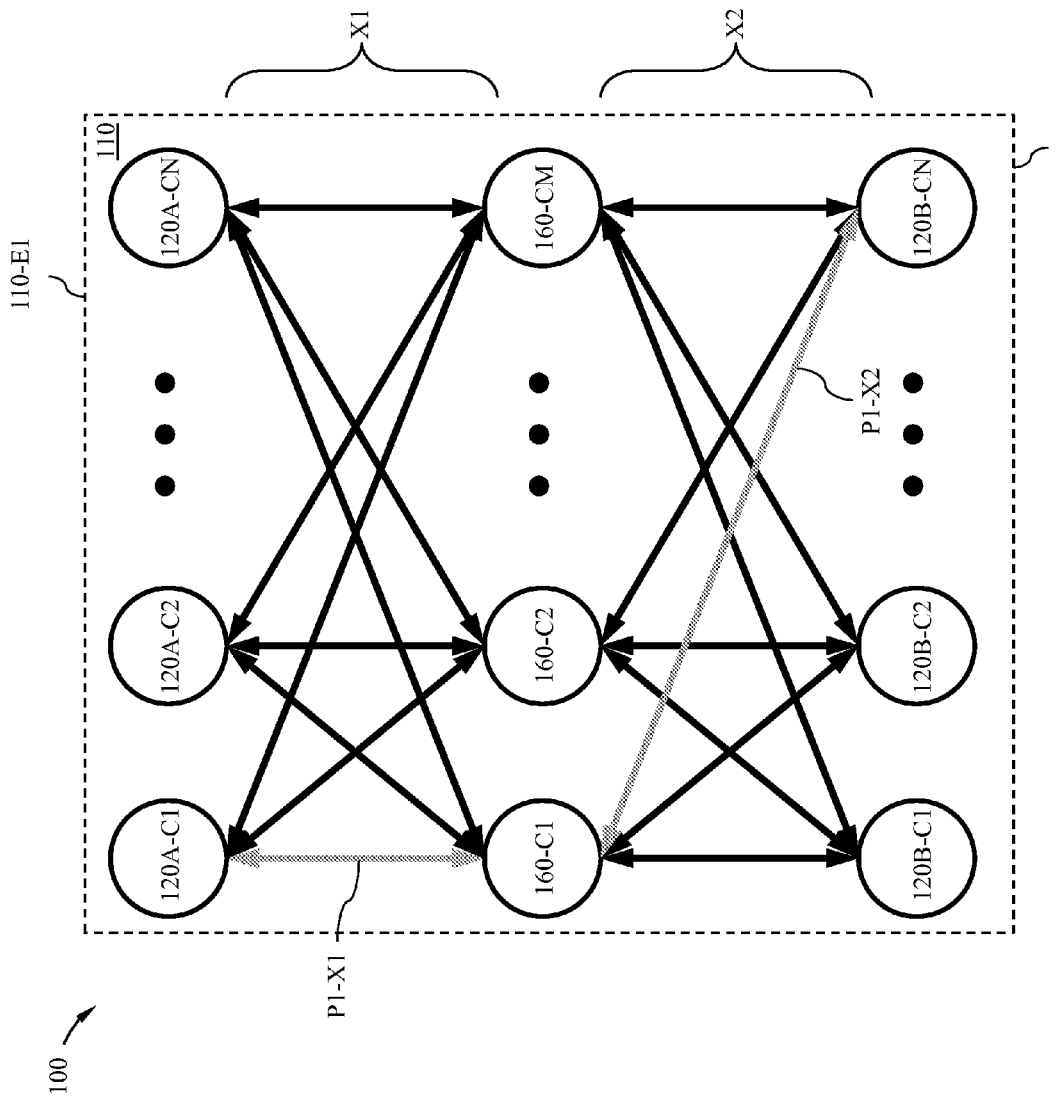
FIG. 4A illustrates an exemplary connectivity within the base architecture of FIG. 1, according to certain aspects of the embodiments of this disclosure.

FIG. 4A illustrates an exemplary connectivity scheme within the base architecture or system 100 of FIG. 1. As discussed above, the backplane 110 may include a number of connectors which facilitate the coupling of the various modules, such as line modules 120 and the switch modules 160. For example, backplane 110 may include a number of connectors 120A-C1 through 120A-CN, collectively referred to as connectors 120A-C, each of which being configured to accept a line module 120A. For example, a first line module 120A-1 may be coupled to the backplane 110 through connector 120A-C1. Similarly, backplane 110 may include a number of connectors 120B-C1 through 120B-CN, collectively referred to as connectors 120B-C, and a number of connectors 160-C1 through 160-CM, collectively referred to as connectors 160-C. Preferably, each signal of each line module 120, e.g. a source line module 120, is provided to each switch module 160, which supplies the signal to a destination line module 120. With each switch module 160 having equal capacity to each line module 120A, 120B, the number of switch modules 160 (M) would be two times the number of line modules 120A, 120B (N), such that if there were 5 line modules 120A and 5 line modules 120B there would be 10 switch modules 160. Additionally, in such a configuration, the backplane 100 and the interconnections X1, X2 would provide full-mesh connectivity.

As further shown in FIG. 4A, connectors 120A are preferably positioned near a first edge 110-E1 of the backplane 110, and connectors 120B are positioned near a second edge 110-E2. Thus, connectors 160-C are centrally located on the backplane, for example, positioned between the connectors 120A and the connectors 120B. This configuration is advantageous since more interconnections X1, X2 may be achieved between the connectors 120-C and the connectors 160-C per routing layer, as described with respect to FIG. 4C below. Accordingly, fewer routing layers as part of the backplane are required to provide full-mesh connectivity with minimal length interconnections X1, X2, leading to lower costs and higher performance. While described as being centrally located between the connectors 120-C, one of ordinary skill will understand that connectors 160-C may be positioned closer to one of the groups of connectors 120A-C, 120B-C. In other words, the connectors 160-C need not be equal distance from connectors 120A-C and connectors 120B-C.

As illustrated in FIG. 4A, the connectors 120A-C are electrically coupled to the connectors 160-C through the interconnects X1, and the connectors 120B-C are electrically coupled to the connectors 160-C through the interconnects X2. Interconnects X1, X2 are shown as being bidirectional, however each interconnect X1, X2 may represent two separate interconnects or groups of interconnects. A first group of interconnects may couple a first of the connectors 120A-C to a first of the connectors 160-C for data transmission in a first direction, and a second group of interconnects may couple the first of the connectors 120A-C to the first of the connectors 160-C in a second direction, as discussed in greater detail below with respect to FIGS. 5A and 5B below. Returning to FIG. 4A, for illustration purposes, a signal, for example a data signal, originating at connector 120A-C1 may be directed to connector 120B-C1 along the path P1. More specifically, the signal originating at the connector 120A-C1 may follow a first path portion P1-X1 to connector 160-C1, and then may follow a second path portion P1-X2 to reach a destination connector 120B-CN.

If desired, one of the connectors 160-C may be provided with a jumper cable which is provided to a second base system 100 (not shown) similar to the base system 100 of FIG. 4A, located in the same node 10 for example. The jumper cable may be configured to electrically couple each of the interconnections X1, X2 of the base system 100 with a connector 160-C of the second base system 100 (not shown). In this way, a signal received at a line module 120 of the base system 100 of FIG. 4A may be provided to the jumper via one of the interconnections X1, X2, and finally to a port of a line module 120 of the second base system 100 (not shown), in accordance with the interconnections provided by the jumper. Alternatively, the jumper may be provided as part of a switch module 160 such that each of the interconnections X1, X2 may be switched by the switch module 160 to a corresponding one of a plurality of conductors as part of the jumper which, in turn, interfaces with the interconnections X1, X2 of the second base system 100 (not shown). In this way, a signal received at a line module 120 of the base system 100 of FIG. 4A may be provided to any port of any of line modules 120 of the second base system 100 (not shown), in accordance with the switching function of the switch module 160.

Figure 4B:
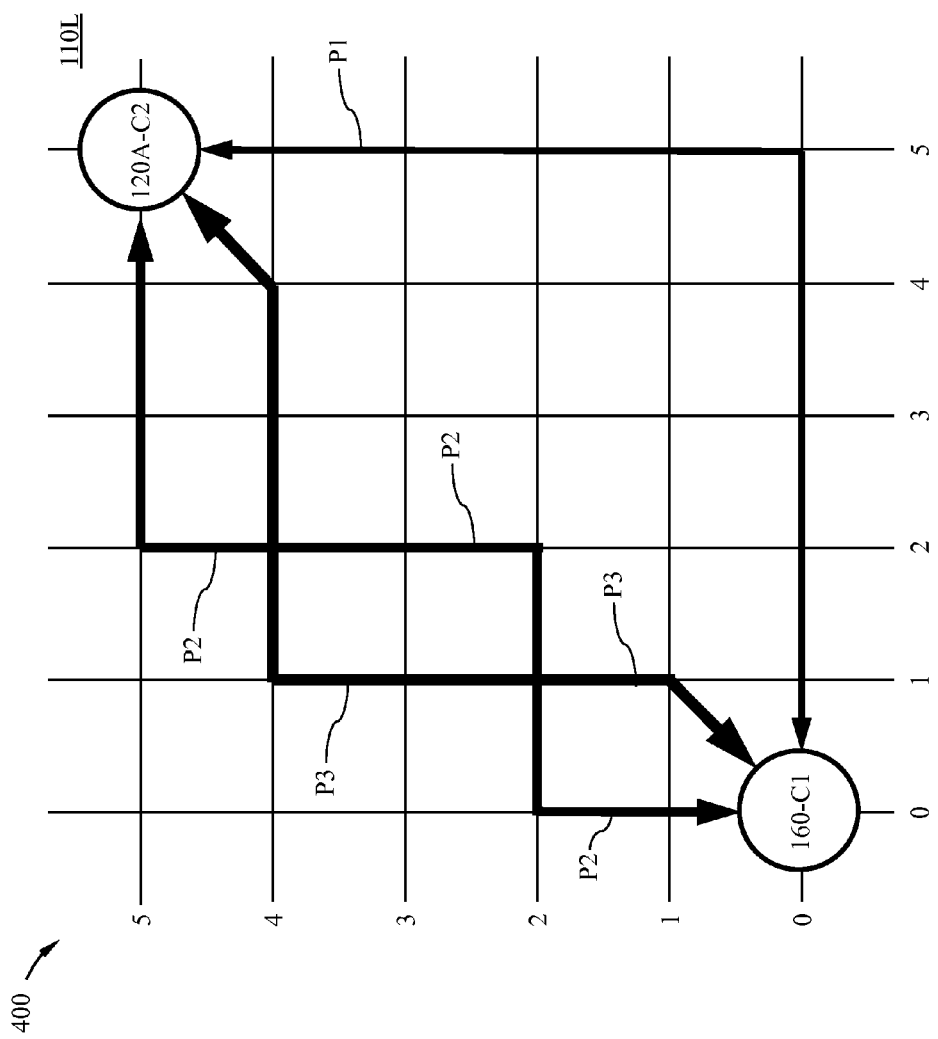
FIG. 4B depicts exemplary interconnection paths along a grid with respect to a line module and a switch module, according to certain aspects of the embodiments of this disclosure.

Turning to FIG. 4B, exemplary routes or paths along a grid 400 on a routing or interconnection layer 110L are shown between a line module connector 120A-C2 which interfaces a line module 120A to the backplane and a switch module connector 160-C1 interfacing a switch module to the backplane 110. Preferably, the path of the interconnections X1 between the line module connector 120A-C2 and the switch module 160 are equal to or less than the corresponding Manhattan length. Here, the Manhattan length is defined as that length along a path on a grid, such as grid 400, between two connecting points, such as the line module connector 120A-C2 and the switch module 160-C1, moving along the path brings you closer to the destination. The Manhattan length can be calculated with respect to two points by summing the absolute differences of their coordinates. Thus, for points P1 (X1,Y1) and P2 (X2,Y2), the Manhattan length is [ABS(Y2−Y1)+ABS(X2−X1)]. The grid can have any resolution. FIG. 4B depicts the switch module connector 160-C1 having coordinates (0,0) and the line module connector 120A-C2 having coordinates (5,5) of grid 400. The Manhattan length between the switch module connector 160-C1 and the line module connector 120A-C2 would be 10 units. Path P1 has a Manhattan length of 10 units. Likewise, path P2 has a Manhattan length of 10 units. Path P3 has a length less than the Manhattan length of 10 units since the path travels along a diagonal from coordinate (0,0) to coordinate (1,1) and from coordinate (4,4) to coordinate (5,5). Preferably, each of the interconnections X1, X2 are equal to or less than the Manhattan length, since longer lengths may lead to undesirable signal degradation, as discussed in greater detail with respect to FIGS. 9-11 below. Interconnections X1, X2 may comprise multiple individual interconnections, thus each individual interconnection preferably has a length equal or less than the corresponding Manhattan length.

FIG. 4C depicts exemplary connections C1, C2, C3 between a connector 120-C/160-C positioned on the backplane 110 and various routing or interconnection layers (only routing or interconnection layers 110-L1, 110-L2, 110-L3 are shown for simplicity), as well as other layers identified as layers 110-LX. Only a small portion of such connections are presented in FIG. 4C on a portion of backplane 110 for purposes of simplicity. The layers 110-LX may include conductive layers, which include electrical or optical circuitry, sandwiched between insulating layers of Nelco 4000-13 or Megtron 6, for example. Such layers 110-LX may be used for transmitting control signals to and from line modules 120 and switch modules 160, and may also include ground planes and power planes, as known in the art. Each routing layer 110-L1, 110-L2, 110-L3 includes a group of interconnections X1-1, X1-2, X1-3, respectively, for connecting each line module connector 120-C to each switch module connectors 160-C. Each routing layer 110-L1, 110-L2, 110-L3 includes electrically conductive traces, cooper traces for example, as is know in the art to define the interconnections X1-1, X1-2, X1-3. Connections C1, C2, C3 between the connector 120-C/160-C and the routing layers 110-L1, 110-L2, 110-L3 are provided through the other layers 110-LX, as is known in the art. The routing layers 110-L1, 110-L2, 110-L3 need not be equally spaced from each other, the layer 110-L3 spaced a first distance 110-LD1 from layer 110-L1 and a second distance 110-LD2 from layer 110-L2, the second distance being greater than the first distance. Other remaining connections between the connector 120-C/160-C and the routing or interconnection layers of the backplane 110 may be similar to those depicted in FIG. 4C.

Turning to FIG. 5A, an exemplary layout of a line module 120 connector 120-C includes four sections 124A-124D, collectively referred to as sections 124. Each of the sections 124 may be divided into, for example, 5 columns 126, labeled 126-1 through 126-5. Each of the columns 126 of connector 120-C include a number of signals 128 which interface or electrically couple between a line card 120 and the backplane 110. More specifically, column 126-5 of section 124A includes connectivity for 10 signals 128A, received from a line module 120 coupled to the connector 120-C of FIG. 5A for example. Each signal 128A may be a single ended signal or, more preferably, a differential signal carried by a differential pair of conductors. For example, column 126-5 may include 10 differential conductor pairs identified as 128A-1 through 128A-10. Additional signals 128B, 128C, 128D are provided to the connector 120-C in a similar way, however the direction of data flow may be different. To decrease the space utilized on the backplane 110 by each connector 120-C, spacing between adjacent columns 126 may be less than the spacing between adjacent signals 128. Positioning signals 128 along a length of the connector 120-C is then advantageous since each individual column, such as column 126-5 of signals 128 may be routed on a single routing layer (not shown). Accordingly, each column 126 of signals 128 may be routed per routing or interconnection layer, requiring a maximum of five routing layers for the routing of the 200 differential pairs of the connector 120-C, as signals 128 for example. While described as having a specific arrangement of sections 124 and columns 126, each section including 50 differential pairs for example, one of original skill in the art would realize that connector 120-C may be configured to include any appropriate number of sections 124 and columns 126 to allow for the further accommodation of additional differential pairs 128.

Turning to FIG. 5B, an exemplary layout of a connector 160-C is similar to the exemplary layout of connector 120-C of FIG. 5A. FIG. 5B illustrates an exemplary layout of a switch module 160 connector 160-C which includes four sections 164A-164D, collectively referred to as sections 164. Sections 164 may be divided into, for example, 5 columns 166, labeled 166-1 through 166-5, each of the columns 166 interfacing or electrically coupling a number of signals 168 between a switch module 160 and the backplane 110. More specifically, column 166-5 of section 164A may include connectivity for 10 signals 168A, received from a switch module 160 coupled to the connector 160-C of FIG. 5B for example. Each signal 168A may be a single ended signal or, more preferably, a differential signal carried by a differential pair of conductors. As with connector 120-C, each column 166-5 of connector 160-C may include 10 differential conductor pairs identified as 168A-1 through 168A-10. Additional signals 168B, 168C, 168D are provided to the connector 160-C in a similar manner, however the direction of data flow may be different. As with the connector 120-C, the spacing between adjacent columns 166 may be less than the spacing between adjacent signals 128. Positioning signals 168 along a length of the connector 160-C is then advantageous since each individual column, such as column 166-5 of signals 168 may be routed on a single routing layer (not shown). Accordingly, each column 166 of signals 68 may be routed per routing or interconnection layer, requiring a maximum of five routing layers for the routing of the 200 differential pairs of the connector 160-C, as signals 168 for example. While described as having a specific arrangement of sections 164 and columns 166, each section including 50 differential pairs for example, one of ordinary skill in the art would realize that connector 160-C may be configured to include any appropriate number of sections 164 and columns 166 to allow for the further accommodation of additional differential pairs 168.

Figure 6:
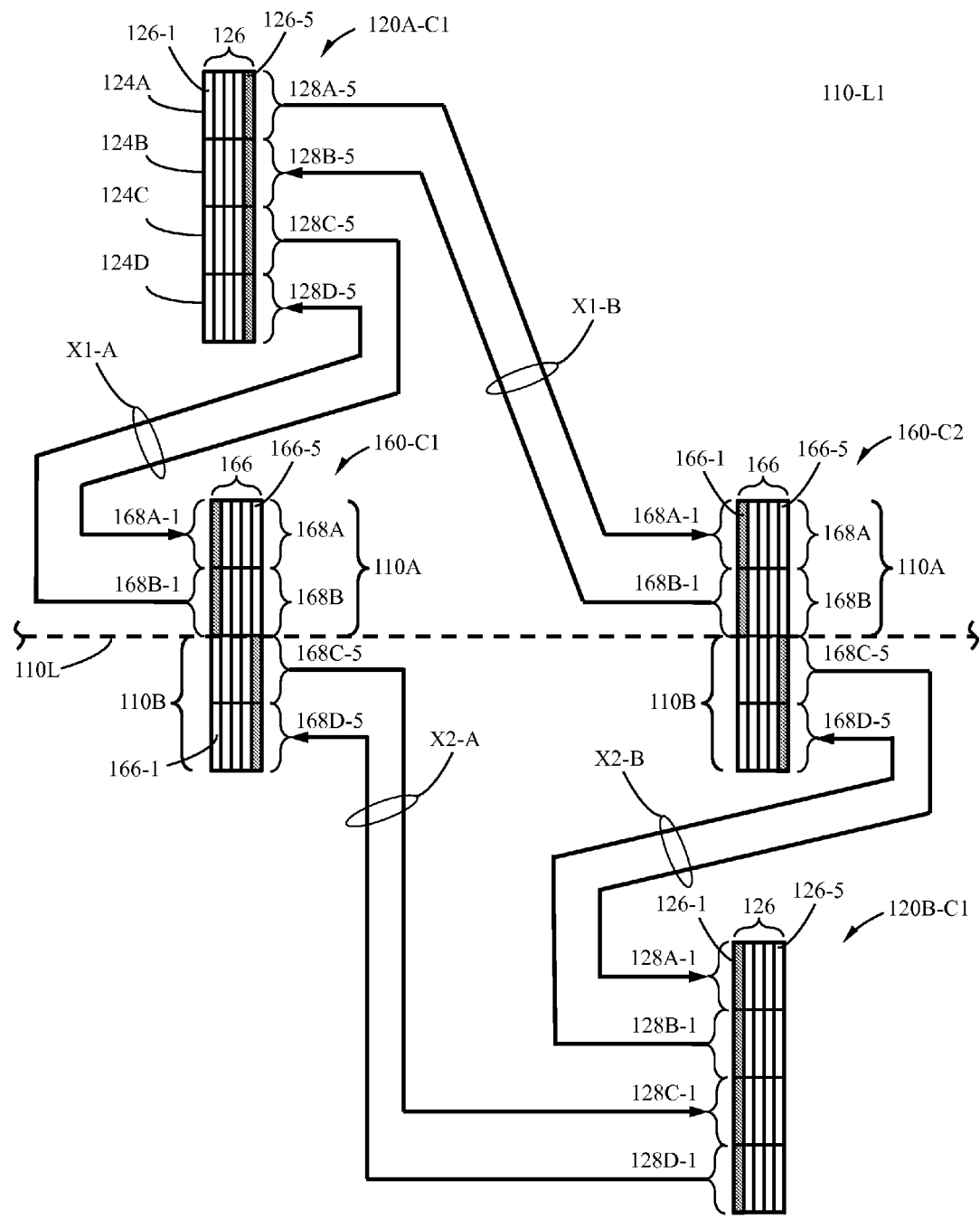
FIG. 6 depicts an exemplary layout of a single routing layer of a backplane, according to certain aspects of the embodiments of this disclosures.

Turning to FIG. 6, an exemplary routing scheme will be discussed in greater detail. The exemplary routing scheme of FIG. 6 contemplates interconnecting five first line modules 120A and five second line modules 120B with ten switch modules 160, providing a full-mesh interconnect via connectors 120A-C1, 120B-C1, 160-C1, 160-C2. Typically, the line module connectors 120A-C associated with line modules 120A are positioned on the backplane 110 on a first side 110A of the switch module connectors 160-C. The line module connectors 120B-C associated with line modules 120B are positioned on the backplane 110 on a second side 110B of the switch module connectors 160-C.

In the routing scheme of FIG. 6, each of the line modules 120A-1 and 120B-1 are routed to two switch modules 160-1 and 160-2 on a routing layer 110-L1. A first group of connections, identified by arrows X1-A, X1-B, are to be made on the first side 110A of the switch module connectors 160-C and a second group of connections, identified by arrows X2-A, X2-B, to be made on the second side 110B of the switch module connectors 160-C. A connection midpoint is defined by dashed-line 110L, for example separating the first side 110A from the second side 110B of the connectors 160-C. The specific position of connectors 120A-C1, 120B-C1, 160-C1, 160-C2 relative to the backplane 110 in FIG. 6 is for illustration purposes only. More specifically, a first column 126-5 of signals 128 of connector 120A-C1, associated with line module 120A-1 (not shown) for example, are routed to two connectors 160-C1, 160-C2, associated with switch modules 160-1, 160-2 (not shown), respectively. As depicted, the connector 120A-C1 may be divided into a first portion defined by sections 124A, 124B and a second portion defined by sections 124C, 124D. Signals 128 from column 126-5 of connector 120A-C1 associated with sections 124A, 124B may be provided, or electrically coupled, to connector 160-C2, while signals 128 from column 126-5 of connector 120A-C1 associated with sections 124C, 124D may be provided to connector 160-C1. Signals 128A-5 may provide signals in a direction from the connector 120A-C1 to the connector 160-C2, while signals 125B-5 may provide signals in a direction from the connector 160-C2 to the connector 120A-C1, as indicated by interconnections X1-B. Similarly, signals 128C-5 may provide signals in a direction from the connector 120A-C1 to the connector 160-C1, while signals 128D-5 may provide signals in a direction from the connector 160-C1 to the connector 120A-C1, as indicated by interconnections X1-A. Signals 128 of line module connector 120B-C1 are routed to switch module connectors 160-C1, 160-C2 over interconnections X2-A, X2-B in a similar fashion as described above with respect to line module connector 120A-C1. However, signals 128 of column 126-1 are shown routed to column 5, sections 168C and 168D of connectors 160-C1, 160-C2, respectively. As one of ordinary skill in the art would realize, the direction of data flow, as described with respect to the routing of FIG. 6, is for illustration purposes only and may be provided in a different configuration, if desired.

As noted above, the signals 128A-5 may represent one or more single-ended or differential signals. For example, signals 128 discussed with respect to FIG. 4 may include 10 differential signals, each provided on a pair of electrical interconnects, as part of interconnects X1, X2. Signals 128 may also include additional signals to be used as spares in the event a failure in one of the main signals, e.g. one of the 10 signals, occurs.

While FIG. 6 depicts the interconnections between two connectors 120A-C1, 120B-C1 associated with two of ten line modules 120, to connectors 160-C1, 160-C2 associated with two of ten switch modules, each of the remaining connectors 120 may be interconnected to two of the remaining connectors 160 on the same layer 110-L1 as depicted in FIG. 6. While FIG. 6 specifically depicts supplying signals 128A-5, 128C-5 of column 126-5 of connector 120A-C1 to connectors 160-C1, 160-C2 and receiving signals 128B-5, 128D-5 of column 126-5 of connector 120A-C1 from connectors 160-C1, 160-C2 on a first routing layer 110-L1, other signals 128 of the remaining columns 126 may be routed on separate layers, as discussed in greater detail with reference to FIG. 7. For example, the signals 128 of column 126-4 may be routed on a second layer 110-L2 (not shown) to an additional two connectors 160-C3, 160-C4 (not shown) in similar fashion as shown with respect to the signals 128 of column 126-5 of connector 120A-C1 and connectors 160-C1, 160-C2. As with connector 120A-C1, signals 128 associated with connector 120B-C1 may be routed on a second routing layer 110-L2 (not shown) to the additional two connectors 160-C3, 160-C4 (not shown), in similar fashion as shown with respect to the signals 128 of column 126-5 of connector 120B-C1 and connectors 160-C1, 160-C2. As discussed above, two connectors 120 are interconnected to two connectors 160 on routing layer 110-L1. Since there are ten connectors 120 and ten connectors 160 on the backplane 110, and with each of the interconnections X1, X2 between the connectors 120, 160 equal to or less than a corresponding Manhattan length associated with each interconnection X1, X2, nine routing layers are needed to interconnect each of the connectors 120, 160. That is, with N line modules and N switch modules, N-1 routing or interconnection layers are needed to interconnect each of the associated connectors 120, 160.

Turning to FIGS. 7A-7I, collectively referred to as FIG. 7, an exemplary full-mesh interconnectivity across nine routing layers of a backplane, will be discussed in greater detail. Where interconnectivity exists between a line module 120 and a switch module 160, such line module 120 is preferably fully connected or coupled to the line module 160. That is, all the signals managed by the line module 120 are connected to the line module 160 on one routing layer, as described in greater detail below. Additionally, while nine routing layers are depicted and discussed with respect to providing full-mesh interconnectivity between ten line modules 120 and ten switch modules 160, any appropriate number of routing layers may be used. Preferably, however, each of the line modules are interconnected with the switch modules following paths having lengths selected to mitigate or reduce certain path characteristics. Such path lengths may be equal to or less than a Manhattan length associated with the path, for example. Such path characteristics, for example, may include fitted attenuation, insertion loss, insertion loss deviation, and return loss, each of which is described in greater detail below. The interconnections X1, X2 may be provided by any suitable material, as is known in the art. For example, the interconnections X1, X2 may be provided by copper traces of sufficient width as to provide for a low impedance interconnect between the line modules 120 and the switch modules 160. The widths of the traces used for the interconnections X1, X2, for example, may be from about 0.005 inches to about 0.009 inches. Additionally, the copper traces may include surfaces which are smoothed, through a chemical process for example, to reduce imperfections which may lead to signal problems. For example, surface imperfections may result in an uneven trace surface effectively increasing the overall length of the trace since the high-speed electrical signal which passes over the trace generally travels at or near the surface of the trace. This increased length may result in signal degradation, as discussed in greater detail below. The backplane 110 may include a printed circuit substrate including any suitable material, and preferably includes Megtron 6, a fiberglass weave and resin system available from Panasonic®. The individual layers of the backplane 110 may interface with the connectors 120-M, 160-M of the line modules 120 and switch modules 160, respectively, through the use of vias which pass through the width of the backplane 110, as is known in the art. Unused via connections may be removed to reduce or mitigate signal degradation, as known in the art. For example, if a signal is to be received on a connector 120-C and provided to routing layer 2, the through-hole of the via may be back drilled to remove other unused connections.

Figure 7A:
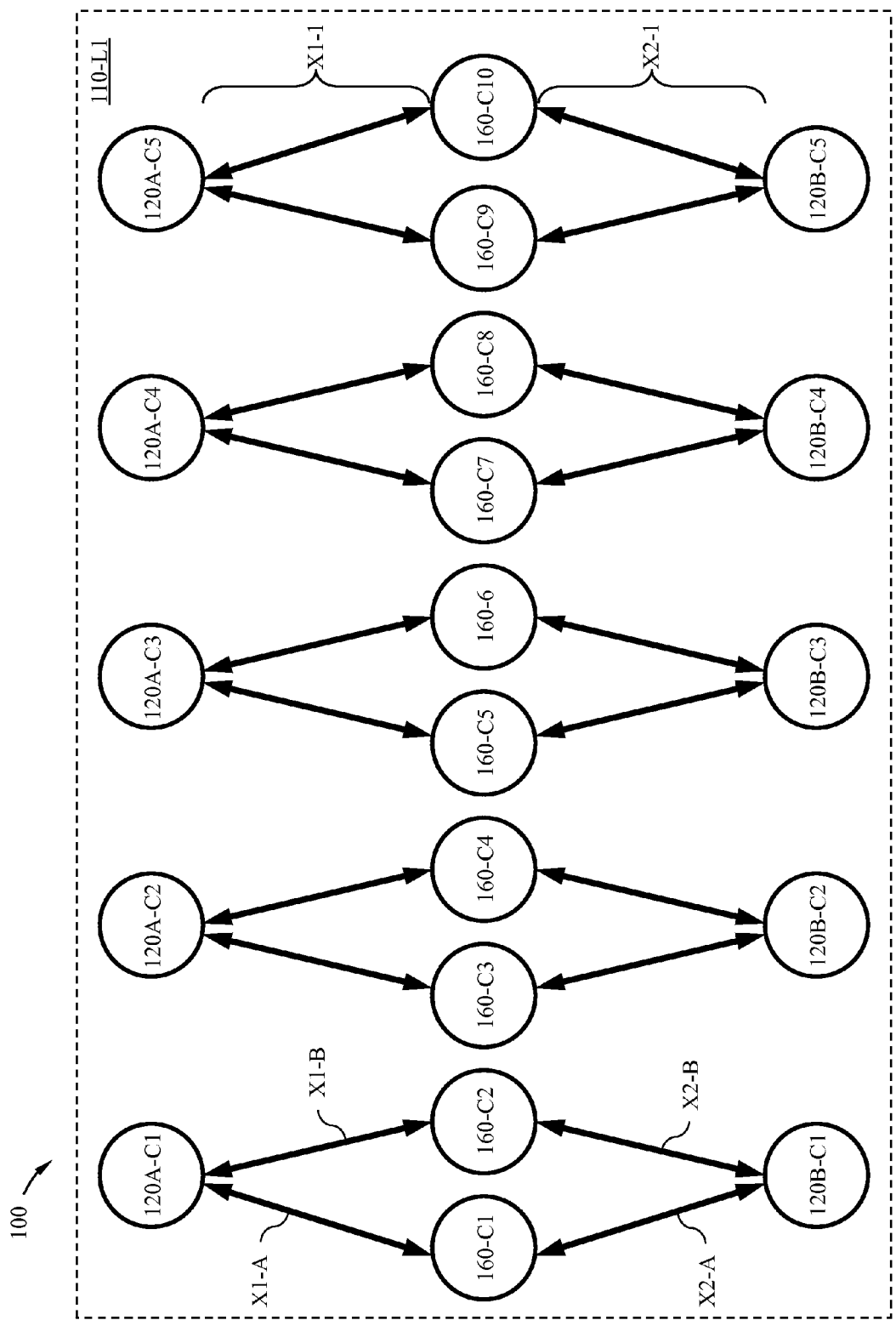
FIGS. 7A-7I depict exemplary interconnects over nine routing layers of a backplane, according to certain aspects of the embodiments of this disclosure.

FIGS. 7A-7I depicts a plurality of groups of interconnections X1-1, X2-1 through X1-9, X2-9, respectively, between line module connectors 120A and switch module connectors 160-C. FIG. 7A depicts interconnections X1-1, X2-1 interconnecting five line modules 120A and five line module 120B with switch modules 160 on a first routing layer 110-L1. As described with respect to FIG. 6, each of the of the line module connectors 120A-C, 120B-C may be interconnected with at most two switch module connectors 160-C on each routing layer, such as routing layer 110-L1 of FIG. 7A. As depicted, line module connectors 120A-C1, 120B-C1 each connect to switch module connectors 160-C1, 160-C2 via interconnections X1, X2, respectively. Line module connectors 120A-C2 through 120A-C5 are coupled to switch module connectors 160-C3 to 160-C10 via interconnections X1, as shown. Similarly, line module connectors 120B-C2 through 120B-C5 are coupled to switch module connectors 160-C3 to 160-C10 via interconnections X2. Since each of the line module connectors 120A-C and 120B-C are interconnected with two switch module connectors 160-C on each routing layer, not every line module 120 or switch module 160 is required to have a connection on each routing layer.

Figure 7B:
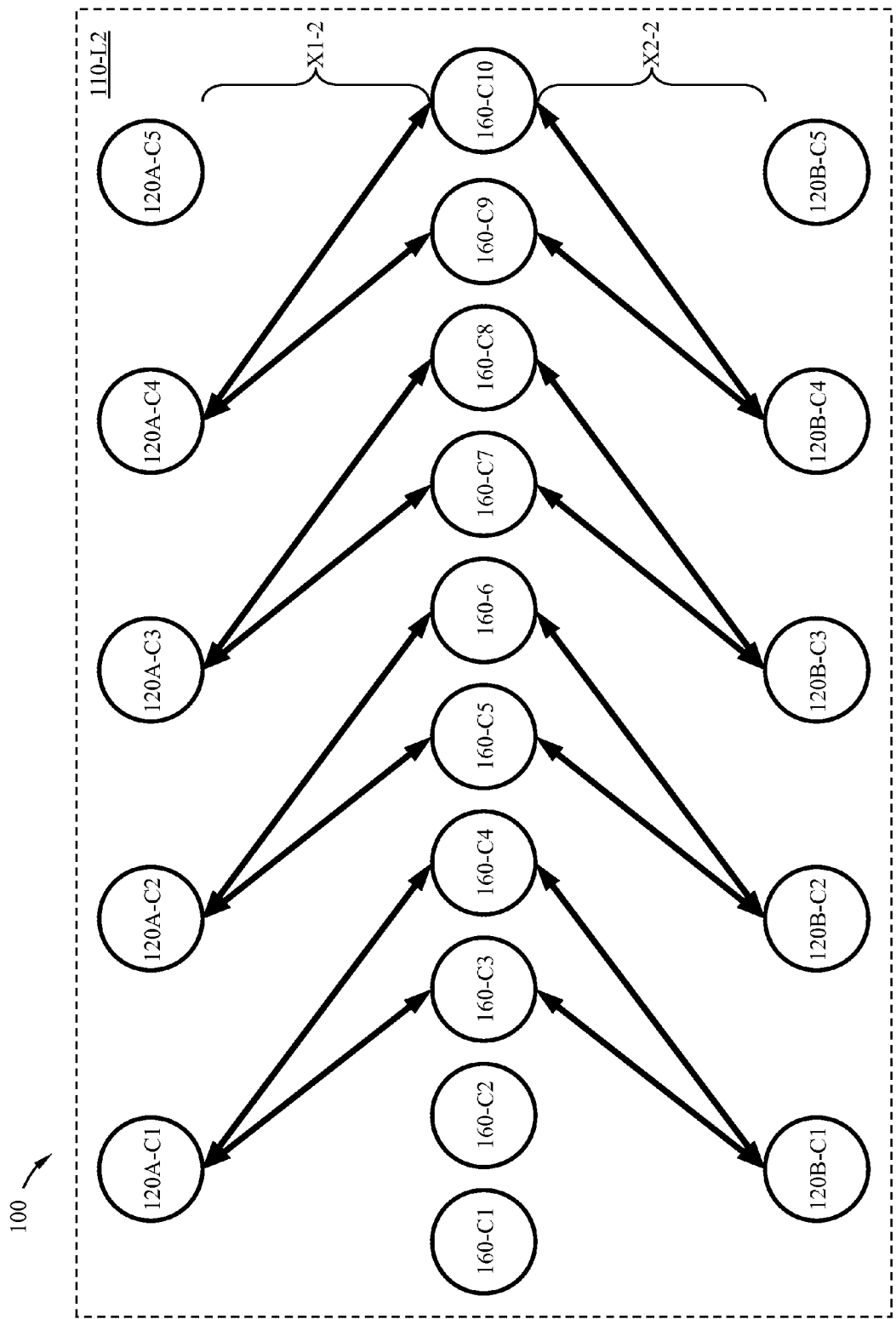

Turning to FIG. 7B, line module connectors 120A-C1, 120B-C1 are coupled to switch modules 160-C3, 160-C4 on a second routing layer 110-L2. Since line module connectors 20A-C1, 120B-C1 are coupled to switch module connectors 160-C1, 160-C2 on the first routing layer 110-L1, and no other line module connector 120-C can be routed directly to the switch module connectors 160-C1, 160-C2, there are no interconnections made with switch module connectors 160-C, 160-C2 on routing layer 110-L2. Similarly, with each of the interconnections X1-2, X2-2 having lengths equal to or less than a corresponding Manhattan length of the associated interconnection, there are no interconnections X1-2, X2-2 made with line module connectors 120A-C5, 120B-C5. As with the line module connectors 120A-C1, 120B-C1, each of the remaining line modules 120 are coupled to two switch modules connectors 160-C adjacent to those switch module connectors 160-C of the previous routing layer, 110-L1 for example. Thus, line module connectors 120A-C2, 120B-C2 are coupled to switch module connectors 160-C5, 160-C6, line module connectors 120A-C3, 120B-C3 are coupled to switch module connectors 160-C7, 160-C8, and line module connectors 120A-C4, 120B-C4 are coupled to switch module connectors 160-C9, 160-C10.

Figure 7C:
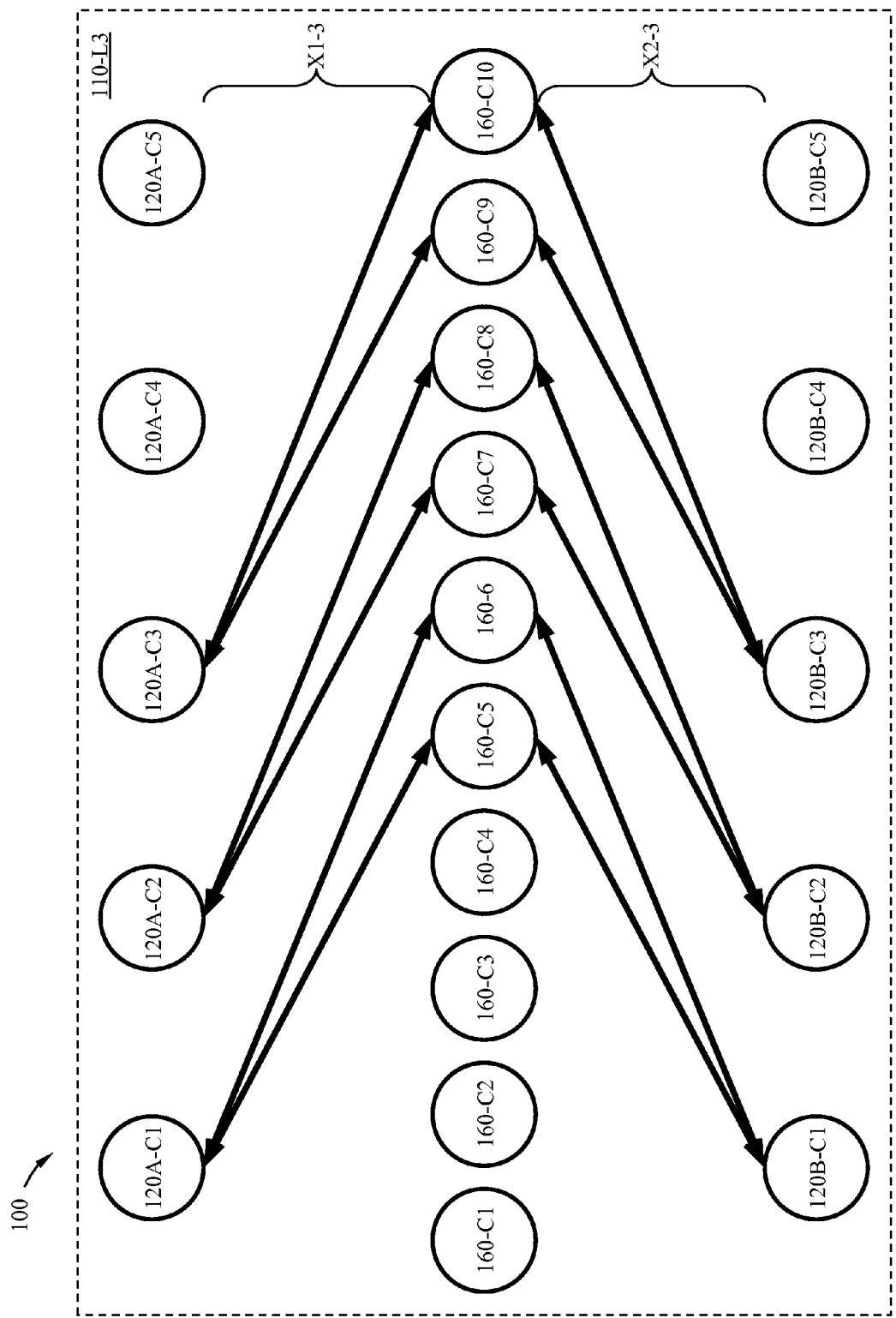
Figure 7D:
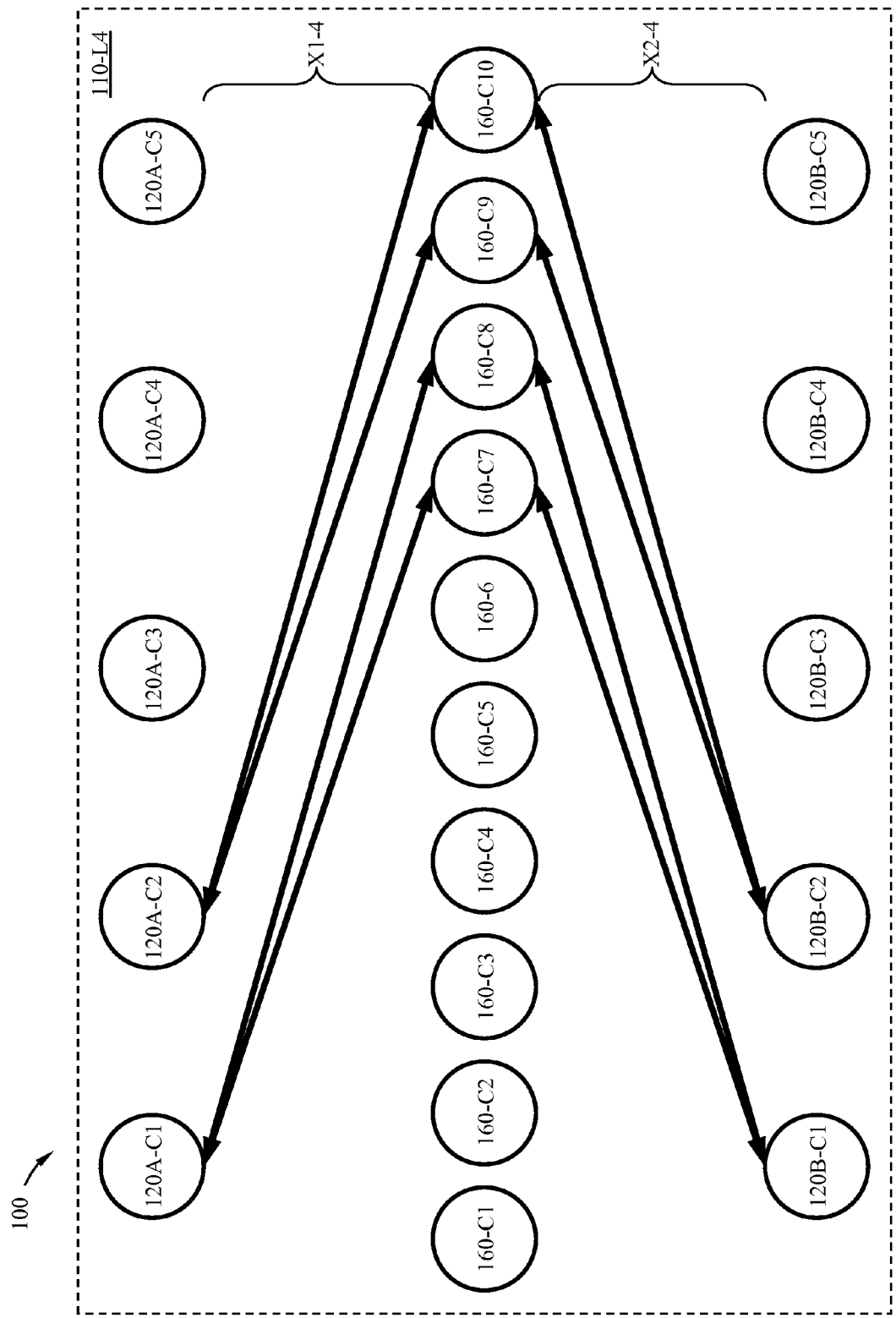
Figure 7E:
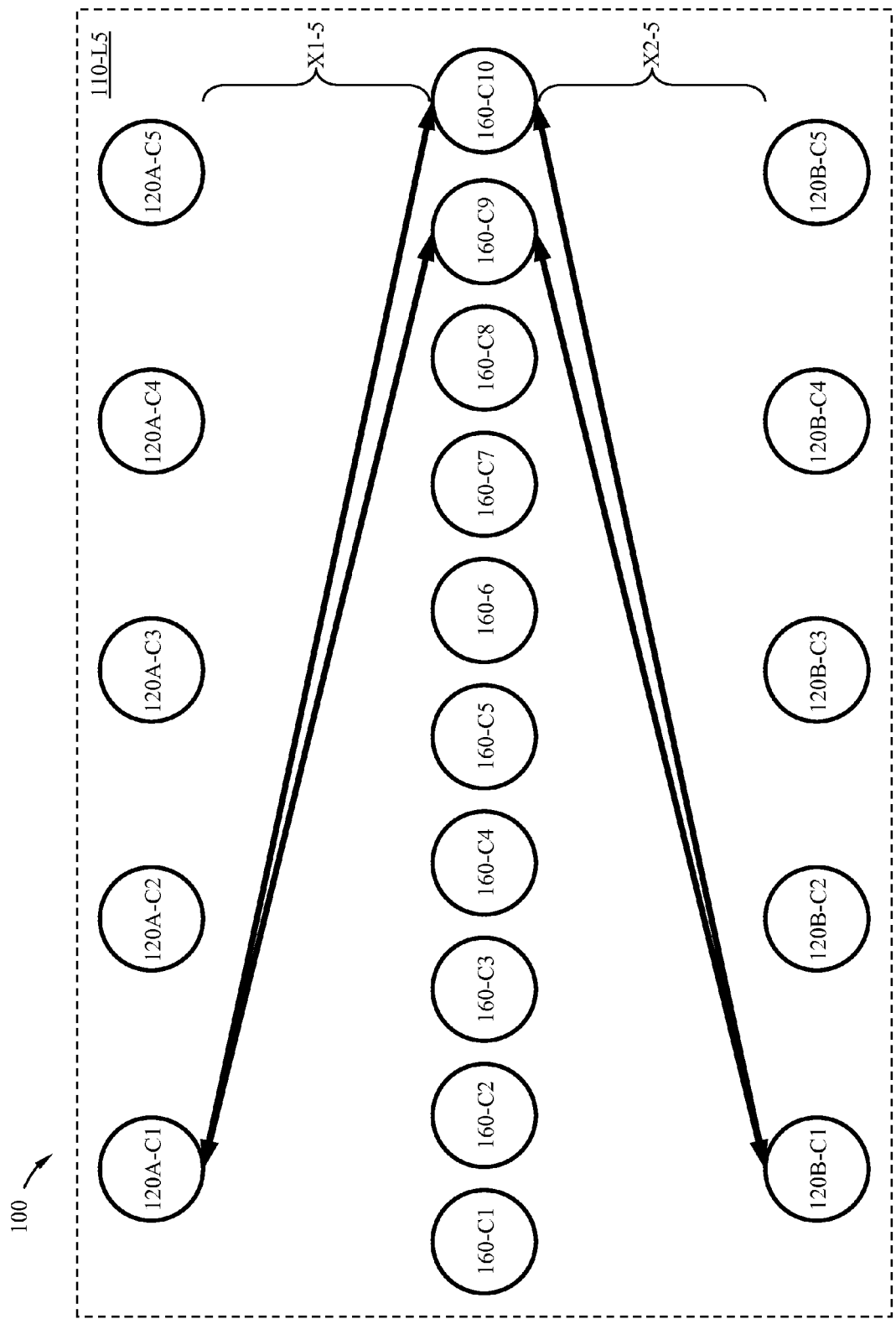

FIG. 7C depicts the exemplary routing of a group of interconnections X1-3, X2-3 on routing layer 110-L3. As shown, line module connectors 120A-C1, 120B-C1 are coupled to switch modules 160-C5, 160-C6, line module connectors 120A-C2, 120B-C2 are coupled to switch modules 160-C7, 160-C8, and line module connectors 120A-C3, 120B-C3 are coupled to switch modules 160-C9, 160-C10. With the length of each interconnection X1-3, X2-3 being less than or equal to a corresponding Manhattan length, no connections are made to switch modules 160-C1 through 160-C4. FIG. 7D depicts the exemplary routing of a group of interconnections X1-4, X2-4 on routing layer 110-L4. As shown, line module connectors 120A-C1, 120B-C1 are coupled to switch module connectors 160-C7, 160-C8 and line module connectors 120A-C2, 120B-C2 are coupled to switch module connectors 160-C9, 160-C10. With the length of each interconnection X1-4, X2-4 being less than or equal to a corresponding Manhattan length, no connections are made to switch module connectors 160-C1 through 160-C6 and line module connectors 120A-C3 through 120A-C5, and 120B-C3 through 120B-C5. FIG. 7E depicts the routing layer 110-L5 where one line module connectors 120A-C1 and 120B-C1 are coupled to switch module connectors 160-C9, 160-C10 via interconnections X1-5, X2-5. With the length of each interconnection X1-5, X2-5 being less than or equal to a corresponding Manhattan length, no other connections are made between the remaining line connectors 120A-C2 through 120A-C5 and 120B-C2 through 120B-C5, and the switch module connectors 160-C1 through 160-C8. As this point the line module connectors 120A-C1, 120B-C1 have be coupled to each of the ten switch module connectors 160-C. Therefore, no further connectivity between line module connectors 120A-C1, 120B-C1 and the switch module connectors 160 need to be established.

Figure 7F:
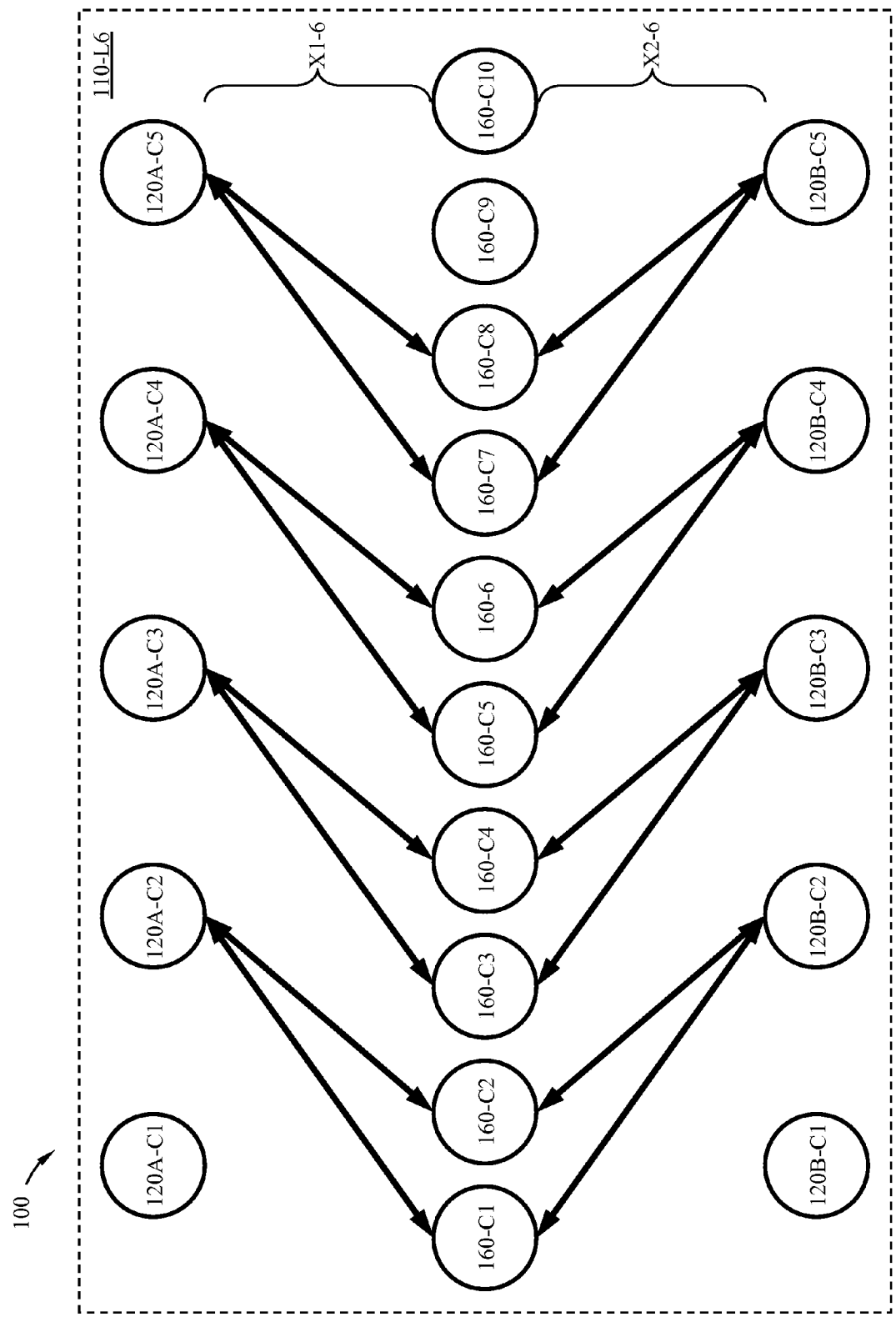
Figure 7G:
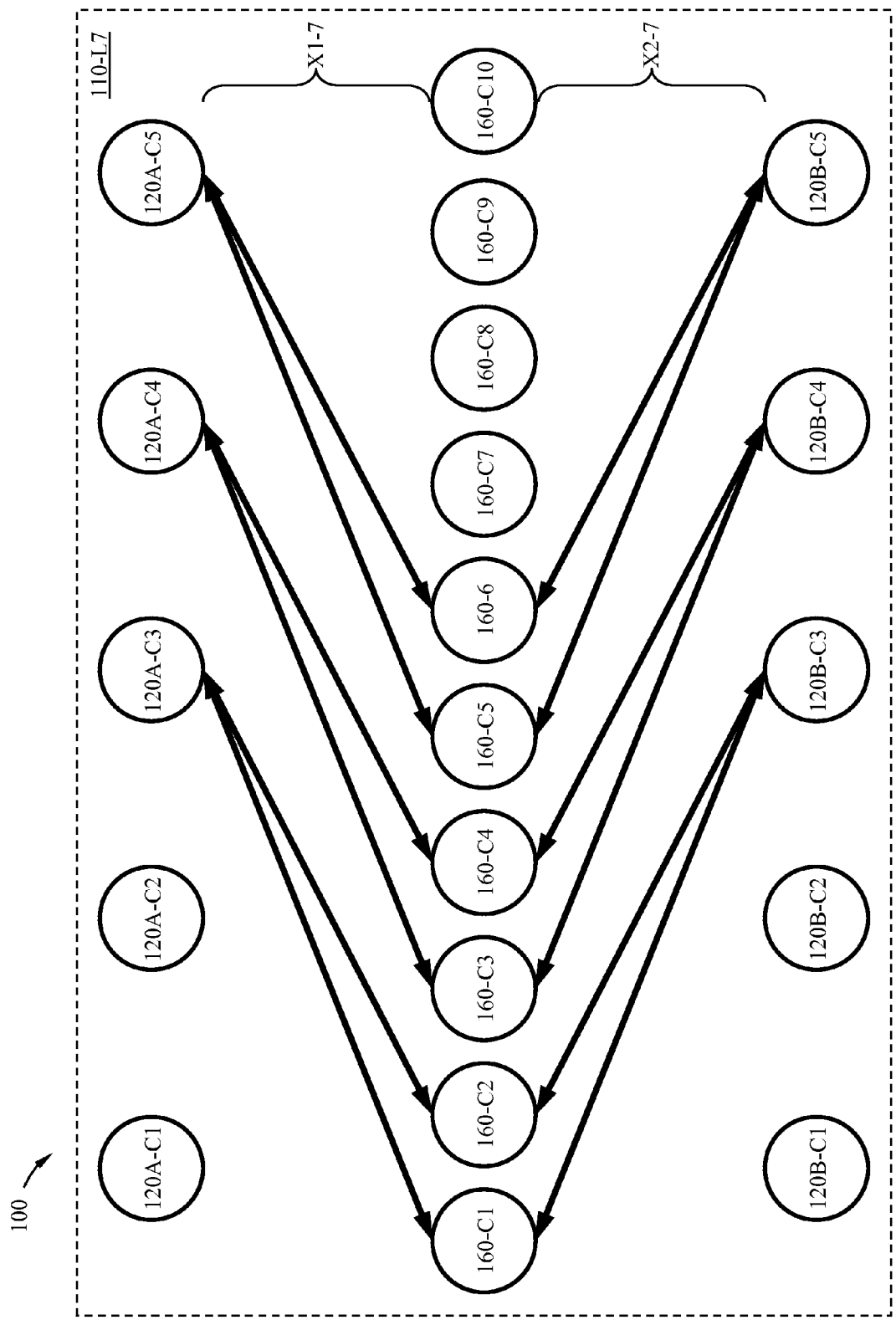

Turning to FIG. 7F, an exemplary routing of a group of interconnections X1-6, X2-6 of routing layer 110-L6 is depicted. Since the line module connectors 120A-C5, 120B-C5 were coupled to switch module connectors 160-C9, 160-C10 on routing layer 110-L1 of FIG. 7A, line module connectors 120A-C5, 120B-C5 are coupled to switch module connectors 160-C7, 160-C8. Line module connectors 120A-C4, 120B-C4 are coupled to switch module connectors 160-C5, 160-C6, line module connectors 120A-C3, 120B-C3 are coupled to switch module connectors 160-C3, 160-C4, and line module connectors 120A-C2, 120B-C2 are coupled to switch module connectors 160-C1, 160-C2, via interconnections X1-6, X2-6. Since all the interconnections related to line module connectors 120A-C1, 120B-C1 have already been achieved, no connections are made to line module connectors 120A-C1, 120B-C1. FIG. 7G depicts a group of interconnections X1-7, X2-7 of routing layer 110-L7. Line module connectors 120A-C5, 120B-C5 are coupled to switch module connectors 160-C5, 160-C6, line module connectors 120A-C4, 120B-C4 are coupled to switch module connectors 160-C3, 160-C4, and line module connectors 120A-C3, 120B-C3 are coupled to switch module connectors 160-C1, 160-C2, via interconnections X1-7, X2-7, as shown. Since line module connectors 120A-C2, 120B-C2 have been coupled to each of the switch module connectors 160 via one or more groups of interconnections X1, X2 in the previous routing layers 110-L1 through 110-L6, no further connections to line module connectors 120A-C2, 120B-C2 need to be made.

Figure 7H:
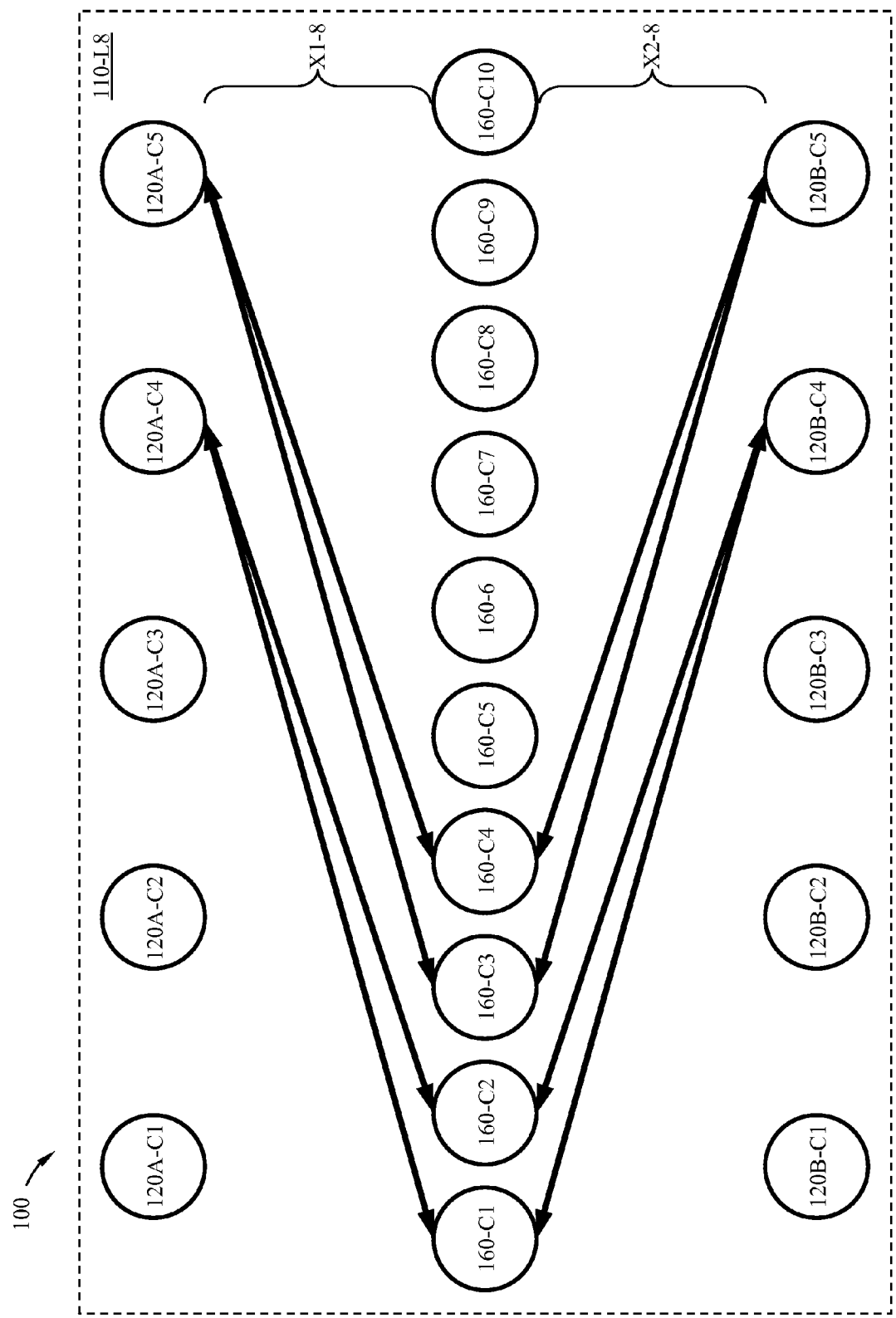
Figure 7I:
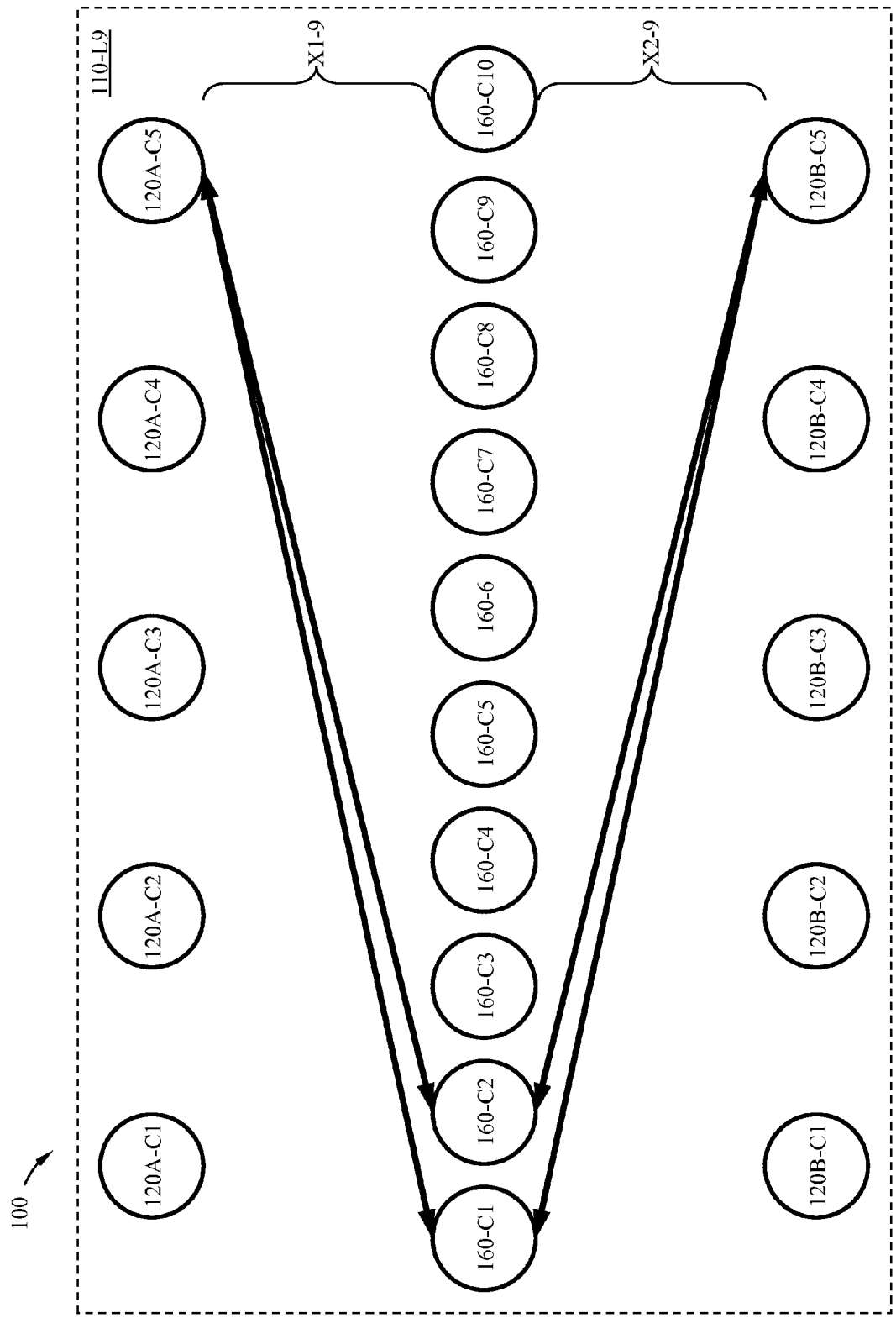

FIG. 7H depicts exemplary routing of a group of interconnections X1-8, X2-8 of routing layer 110-L8. Line module connectors 120A-C5, 120B-C5 are coupled to switch module connectors 160-C3, 160-C4, and line module connectors 120A-C4, 120B-C4 are coupled to switch module connectors 160-C1, 160-C2, via interconnections X1-8, X2-8. Since line module connectors 120A-C3, 120B-C3 have been coupled to each of the switch module connectors 160 via one or more groups of interconnections X1, X2 in the previous routing layers 110-L1 through 110-L7, no further connections to line module connectors 120A-C3, 120B-C3 need to be made. FIG. 7I depicts a group of interconnections X1-9, X2-9 of the ninth and final routing layer 110-L9. Line module connectors 120A-C5, 120B-C5 are coupled to switch modules 160-C1, 160-C2, via interconnections X1-9, X2-9. Since line module connectors 120A-C4, 120B-C4 have been coupled to each of the switch module connectors 160 via one or more interconnections X1, X2 in previous routing layers 110-L1 through 110-L8, no further connections to line module connections 120A-C4, 120B-C4 need to be made.

Figure 8:
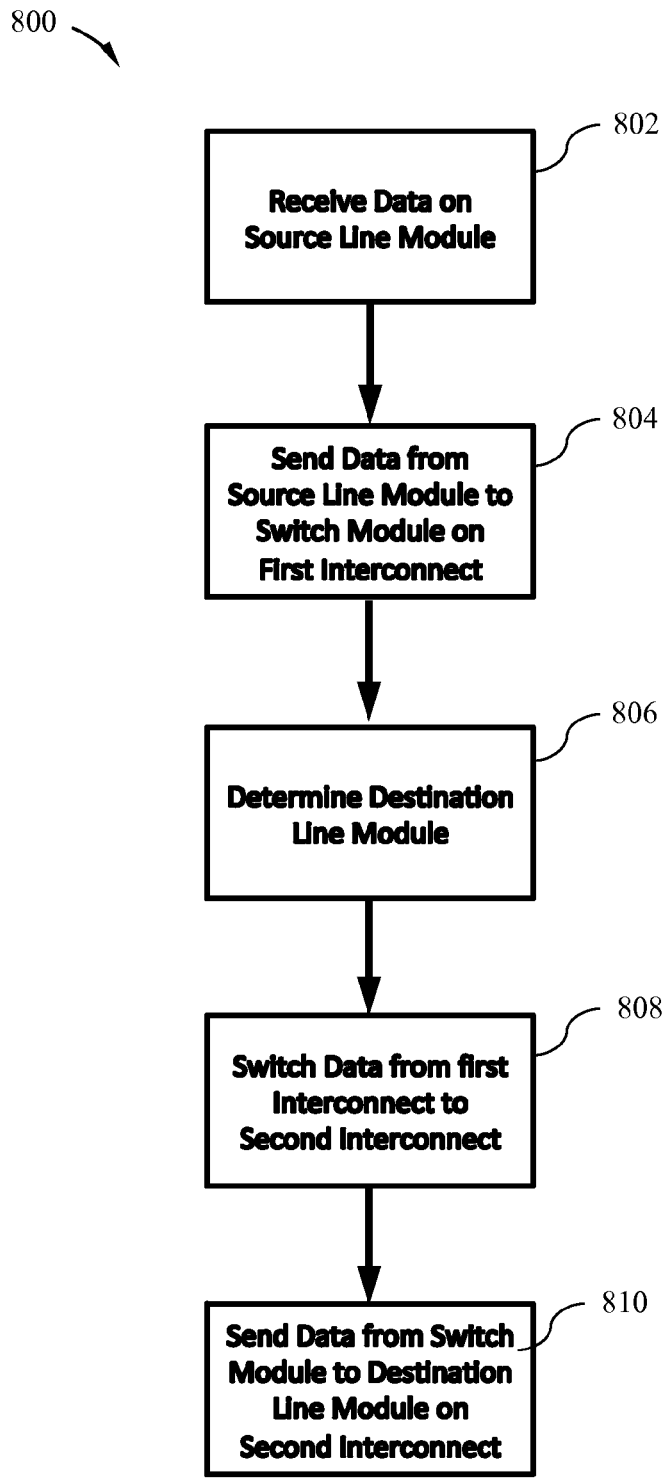
FIG. 8 depicts a method of data interconnectivity, according to certain aspects of the embodiments of this disclosure.

Turning to FIG. 8, a method 800 of data interconnectivity, according to certain aspects of the embodiments of this disclosure, will be described in greater detail. A source module, for example a line module 120, receives a data signal, e.g.

optical signal 102, in a step 802 and processes the data signal into an electrical data signal. The electrical data signal is sent from the source line module 120 to a switch module 160 on a first interconnect, for example one of the interconnects X1, X2, in a step 804. The destination module, a second of the line modules 120, is then determined in a step 806. The switch module 160 then switches the electrical signal from the first interconnect to a second interconnect in a step 808, such that the data is sent from the switch module to the destination module on the second interconnect in a step 810. In this way, any data signal received on an input at a source line module 120 may be switched to an output of a destination line module 120.

Figure 9:
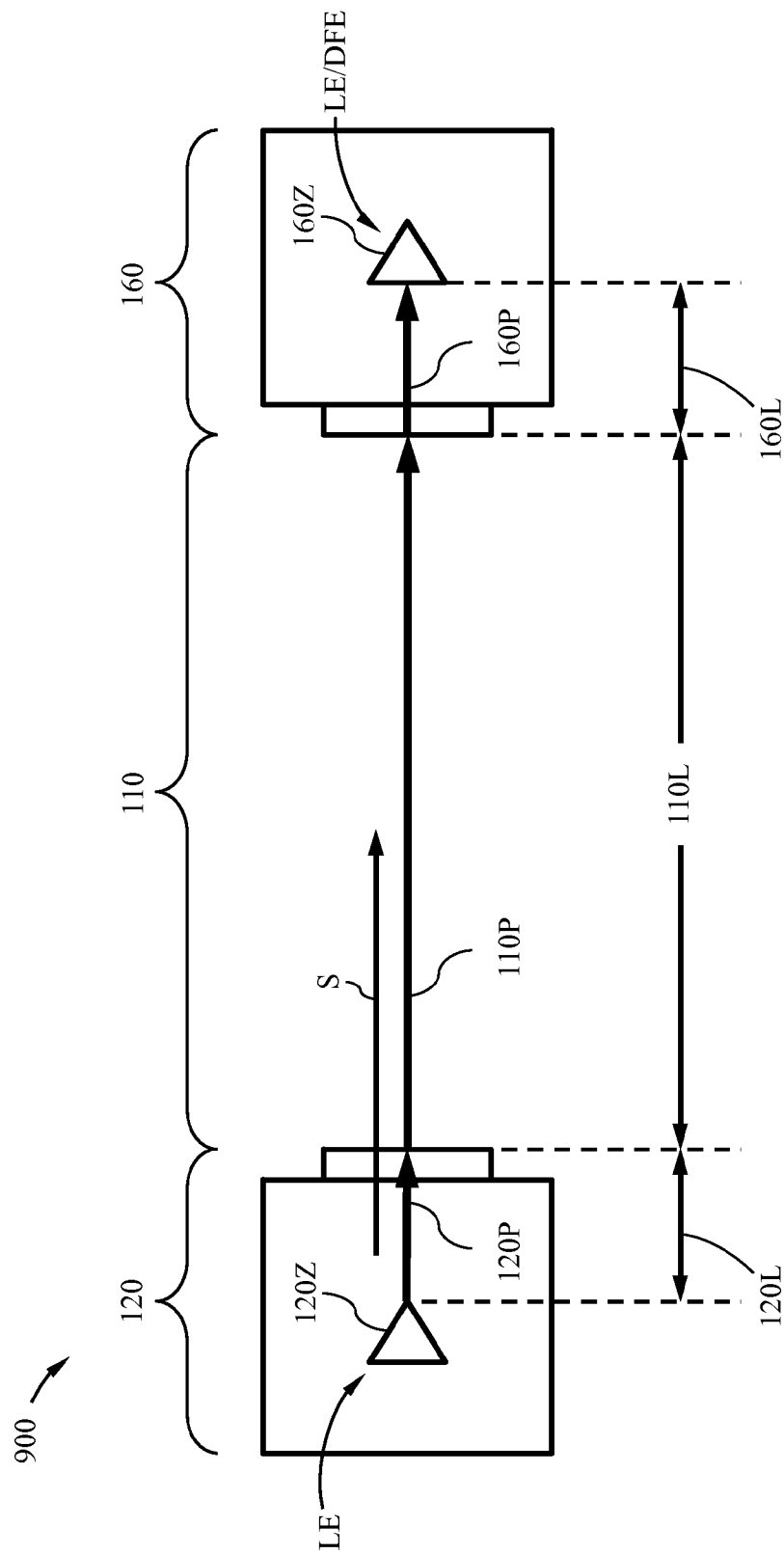
FIG. 9 depicts interconnectivity of an exemplary channel from a line module to a switch module.
Figures 10A, 10B:
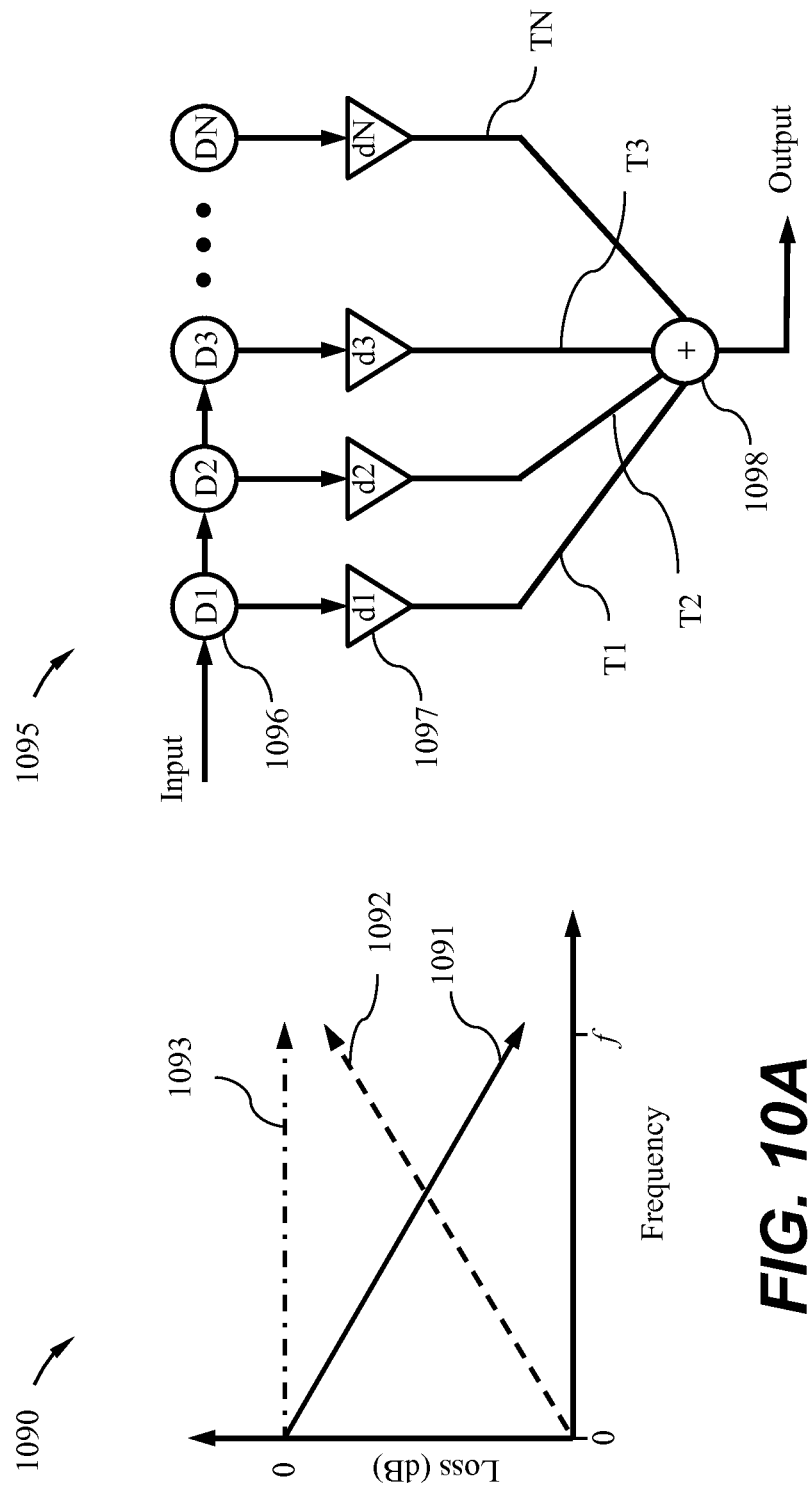
FIG. 10A depicts amplitude loss vs. frequency over an exemplary interconnection.
FIG. 10B depicts a block diagram of a system for compensating for certain losses associated with exemplary interconnections of the embodiments of this disclosure, including the amplitude loss depicted in FIG. 10A.

FIG. 9 depicts an exemplary interconnect 900, represented by the combination of individual paths 120P, 110P, 160P, collectively referred to as path P, between a circuit 120Z of the line module 120 and a circuit 160Z of the switch module 160 via backplane 110. Such an exemplary interconnect 900, as shown, may be used for each of the interconnections between each of the line modules 120 and each of the switch modules 160, regardless of whether the signal is traveling from a line module 120 to a switch module 160, or from a switch module 160 to a line module 120. Since transmission lines, such as copper traces which may be used to provide the exemplary interconnect between the circuit 120Z of the line module 120, backplane 110, and the circuit 160Z of the switch module 160, are lossy, signal loss generally occurs as a signal (represented by arrow S) propagates along the path P. Turning to FIG. 10A, a first curve 1091 of a graph 1090 represents a first transfer function related to a signal propagating along the path P, for example the signal S transmitted from an output of the circuit 120Z of the line module 120 and received by an input at the circuit 160Z of the switch module 160. As illustrated by curve 1091, as the frequency of the propagating signal S increases, amplitude loss of the signal is observed. To compensate for this amplitude loss, a linear equalizer LE may be provided at the line module 120, as part of the circuit 120Z for example. The linear equalizer may amplify the propagating signal S in accordance with a second transfer function as depicted by a second curve 1092.

As the signal S propagates along the path P, the first transfer function of curve 1091 is convolved with the second transfer function of curve 1092, and the propagating signal S, as received by the circuit 160Z of the switch module 160 has a response according to a curve 1093. At switch module 160, Signal S may be equalized by linear equalizer LE to have a substantially flat response over the frequency range f. Since each of the paths 120P, 110P, 160P may vary from one signal to another signal, for example in length and electrical characteristics, the transfer function associated with each of the plurality of signals may also vary. As should be apparent to one of ordinary skill in the art, signals as received by the switch module 160 need not have the flat response of curve 1093. Rather, by providing the linear equalizer LE of the line module with a different amplification scheme, e.g. in accordance with a different transfer function, the response of the propagating signal S as received by the circuit 160Z of the switch module 160 may be tailored to have a desired frequency response different than what is represented by curve 1093 of graph 1090. If desired, linear equalizer LE may also be provided in the switch module, as part of circuit 160Z for example, to further adjust the frequency response of the propagating signal S.

Returning to FIG. 9, the signal output from the linear equalizer LE of the line module 120 travels along the path 120P having a length 120L. Once applied to the backplane 110, as discussed in greater detail above, the signal S travels along the path 110P having a length 110L. The signal S is then interfaced to the switch module 160, as discussed in greater detail above, along a path 160P having a length 160L. As mentioned above, the switch module 160 may also include a linear equalizer LE, as part of circuit 160Z, to correct for amplitude loss the signal S may observe over the path P. The switch module 160 may include additional circuitry to mitigate or compensate for signal degradation. Such additional circuitry may include, for example, an adaptive equalizer such as a decision feedback equalizer ("DFE"), as part of circuit 160Z for example. The DFE may compensate for additional amplitude loss, as well as propagation delays as between two or more signals S.

Turning to FIG. 10B, an exemplary DFE may be implemented as a digital filter 1095. The digital filter 1095 may include N taps T1 through TN, each tap including a corresponding delay unit D1 through DN and an amplifier d1 through dN. The signal received at the switch module 160 may be provided as an input to the digital filter 1095. The signal then propagates along the delay units D1 through DN, each delay unit providing a delay to the signal prior to providing the signal to the corresponding amplifier d1 through dN. Each amplifier d1 through DN may provide the same gain or a different gain. As should be understood by one of ordinary skill in the art, the gain can be between a value of 0 and 1, and thus may also be referred to as an attenuation. The gained tap signals of each tap T1 through TN are provided to a summer 1098 which sums the individual tap signals and provides the summed signal as an output signal, as shown, for further processing if desired. The LE of line module 120 and the LE/DFE of switch module 160 may, for example, be provided by an application specific integrated circuit or a field programmable gate array.

Turning to FIG. 11, a table 1100 depicts certain signal characteristics of electrical signals propagating the exemplary paths 120P, 110P, 160P having different lengths. The signal characteristics are compared with acceptable tolerances as provided in the Institute of Electrical and Electronics Engineers (IEEE) specification IEEE 802.3ap-2007 (10 GBASE-KR). Such signal characteristics include fitted attenuation (Af), insertion loss (IL), insertion loss deviation (ILD), and return loss (RL). Af is defined to be the least mean squares line fit to the insertion loss computed over a frequency range, from about 0 to about 10 GHz for example. IL is a measure of attenuation along the exemplary path 120P, 110P, 160P at various frequencies across a frequency range, from about 0 Hz to about 10 GHz for example. ILD is defined as the difference between Af and IL. RL is defined as the amount of energy that is reflected back to the line module 120 from the switch module 160 and is a measure of the efficiency of the transmission channel.

There is a balance between the number of layers in the backplane 110 and the lengths of the individual paths 120P, 110P, 160P. Increasing the number of layers in the backplane 110 results in increased costs, while decreasing the number of layers requires longer path lengths which may lead to signal degradation, and ultimately data errors. As depicted in table 1100, an exemplary solution 1199 is defined which provides individual path lengths 120P, 110P, 160P which result in reduced signal degradation. The individual lengths 120P, 110P, 160P are provided in the Sub-Lengths column in inches, the provided lengths given in the form of "120P length—110P length—160P length". Thus, an entry of 4-10-4 provides for the 120P length of 4 inches, the 110P length of 10 inches and the 160P length of 4 inches. As indicated by the solution 1199, it has been observed that 120P path lengths greater than or equal to about 4 inches is preferable. 120P lengths less than about 4 inches may increase RL and ILD. Also, Path 120P, 160P lengths are preferably less than about 10 inches, since longer lengths may result in undesirable Af and IL. Preferably, the path 110P length is greater than about 10 inches and less than about 24 inches. Path 110P lengths less than about 10 inches may result in increase RL and ILD, while path 110P lengths greater than about 24 inches may result in increased Af and IL. The preferred length ranges defined above result in an overall exemplary path, e.g. path including 120P, 110P, and 160P, length range of from about 24 inches to about 46 inches. If desired, lengths of the various paths 120P, 110P, 160P can be increased by giving the paths a serpentine shape.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An interconnection system, comprising:
    a backplane including a plurality of interconnection layers, each of the plurality of interconnection layers including a respective one of a plurality of groups of interconnections;
    a plurality of line modules; and
    a plurality of switch modules, wherein each of the plurality of line modules is connected to not more than two of the plurality of switch modules via respective first and second interconnections of a corresponding one of the plurality of groups of interconnections, and first and second ends of each interconnection in each of the plurality of groups of interconnections are associated with a corresponding one of a plurality of Manhattan lengths, said each interconnection having a length that is less than a corresponding one of the plurality of Manhattan lengths associated with said each interconnection,
    wherein a number of the plurality of line modules is equal to the number of the plurality of switch modules,
    wherein the plurality of line modules includes a first plurality of line modules and a second plurality of line modules, a number of the first plurality of line modules being the same as a number of the second plurality of line modules, and
    wherein a number of the plurality of groups of interconnection layers is equal to the number of the plurality of switch modules-1.

2. The interconnection system of claim 1, wherein the plurality of groups of interconnections provide full-mesh interconnectivity between the plurality of line modules.

3. The interconnection system of claim 1, wherein the plurality of line modules includes a first plurality of line modules and a second plurality of line modules, the backplane has a planar surface having first, second and third regions, the first plurality of line modules being provided on the first region, the second plurality of line modules being provided on the second region, and the plurality of switch modules being provided on the third region, the first region being spaced from the second regions, such that the third region is between the first and second regions.

4. The interconnection system of claim 1, wherein the plurality of line modules includes a first plurality of line modules and a second plurality of line modules, a number of the first plurality of line modules being equal to a number of the second plurality of line modules, and a number of the plurality of line modules being equal to the number of switch modules.

5. The interconnection system of claim 1, wherein the number of the plurality of switch modules is 10.

6. The interconnection system of claim 1, wherein each of the plurality of groups of interconnections includes a plurality of conductor pairs, each of the plurality of conductor pairs being configured to carry a corresponding one of a plurality of signals.

7. The interconnection system of claim 6, wherein each of the plurality of signals is a corresponding one of a plurality of differential signals.

8. The interconnection system of claim 7, wherein each of the plurality of differential signals is a 10 Gbps signal.

9. The interconnection system of claim 1, wherein each of the plurality of groups of interconnections includes a corresponding one of a plurality of copper traces.

10. The interconnection system of claim 9, wherein said each of the plurality of copper traces has a width which is within the range of 0.005 inches to 0.009.

11. The interconnection system of claim 1, wherein the interconnection system conforms with an IEEE Std. 802.3ap-2007 specification.

12. The interconnection system of claim 1, wherein each of the plurality of groups of interconnections has a length between 10 inches and 24 inches.

13. The interconnection system of claim 1, wherein the backplane includes Megtron 6.

14. The interconnection system of claim 1, further comprising a plurality of connectors provided on the backplane, each of the plurality of connectors being configured to couple a corresponding one of the plurality of line modules to the backplane.

15. The interconnection system of claim 14, wherein the plurality of connectors is a first plurality of connectors, the interconnection system further comprising a second plurality of connectors provided on the backplane, each of the second plurality of connectors being configured to couple a corresponding one of the plurality of switch modules to the backplane.

16. The interconnection system of claim 15, wherein a corresponding one of the plurality of second connectors is configured to couple first and second ones of the plurality of switch modules to the backplane.

17. The interconnection system of claim 15, wherein no connector of the second plurality of connectors is connected to any other connector of the second plurality of connectors.

18. The interconnection system of claim 1, wherein each of the plurality of groups of interconnections is provided on at most one of the plurality of layers of the backplane.

* * * * *